US010770782B2

(12) United States Patent
Aizawa et al.

(10) Patent No.: US 10,770,782 B2
(45) Date of Patent: Sep. 8, 2020

(54) ELECTRONIC APPARATUS

(71) Applicant: SEIKO EPSON CORPORATION, Tokyo (JP)

(72) Inventors: Tadashi Aizawa, Matsumoto (JP); Seiji Osawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 20 days.

(21) Appl. No.: 16/296,792

(22) Filed: Mar. 8, 2019

(65) Prior Publication Data

US 2019/0280369 A1    Sep. 12, 2019

(30) Foreign Application Priority Data

Mar. 9, 2018  (JP) ................................ 2018-042788

(51) Int. Cl.
| | |
|---|---|
| *H01Q 1/00* | (2006.01) |
| *H01Q 1/24* | (2006.01) |
| *G04G 17/04* | (2006.01) |
| *G04G 21/04* | (2013.01) |
| *H01Q 1/27* | (2006.01) |
| *G01S 19/36* | (2010.01) |

(Continued)

(52) U.S. Cl.
CPC ............ *H01Q 1/241* (2013.01); *G01S 19/14* (2013.01); *G01S 19/36* (2013.01); *G04G 17/04* (2013.01); *G04G 21/04* (2013.01); *G04R 60/10* (2013.01); *H01Q 1/273* (2013.01); *G04B 47/00* (2013.01); *G04G 17/045* (2013.01); *G04G 17/08* (2013.01); *H01Q 1/12* (2013.01); *H01Q 1/125* (2013.01); *H01Q 1/242* (2013.01); *H01Q 1/42* (2013.01)

(58) Field of Classification Search
CPC ............ H01Q 1/12; H01Q 1/42; H01Q 1/125; H01Q 1/242; H01Q 1/273; G04B 47/00; G04G 17/08; G04G 17/045; G04R 60/10
See application file for complete search history.

(56) References Cited

U.S. PATENT DOCUMENTS

| | | | | |
|---|---|---|---|---|
| 4,884,252 | A | * 11/1989 | Teodoridis ............... | H01Q 1/44 368/10 |
| 5,168,281 | A | * 12/1992 | Tokunaga .............. | H01Q 1/273 343/718 |

(Continued)

FOREIGN PATENT DOCUMENTS

| | | |
|---|---|---|
| JP | H08-213819 A | 8/1996 |
| JP | 2013-247598 A | 12/2013 |

(Continued)

*Primary Examiner* — Thuy Vinh Tran
(74) *Attorney, Agent, or Firm* — Oliff PLC

(57) ABSTRACT

An electronic apparatus includes: a circuit substrate on which circuit components are disposed; and an antenna that includes a first electrode and a second electrode which is opposite to a surface of the circuit substrate, on which the circuit components are disposed, and includes a projection portion protruding in a direction from the second electrode toward the circuit substrate, a top portion of the projection portion not overlapping with the circuit components in plan view along a thickness direction of the circuit substrate. In the antenna including the first electrode and the second electrode, even if a surface of the antenna has an unevenness shape, as an average of thicknesses of the antenna is thicker, sensitivity of the antenna is improved.

14 Claims, 17 Drawing Sheets

(51) Int. Cl.
    *G01S 19/14*     (2010.01)
    *G04R 60/10*     (2013.01)
    *G04B 47/00*     (2006.01)
    *H01Q 1/12*     (2006.01)
    *G04G 17/08*     (2006.01)
    *H01Q 1/42*     (2006.01)

(56) References Cited

U.S. PATENT DOCUMENTS

| | | | |
|---|---|---|---|
| 5,646,634 A | | 7/1997 | Bokhari et al. |
| 5,907,522 A | * | 5/1999 | Teodoridis ............. H01Q 1/273 368/10 |
| 9,134,704 B2 | * | 9/2015 | Aizawa ................ G04R 60/10 |
| 9,837,705 B2 | * | 12/2017 | Aizawa ................ H01Q 1/273 |
| 10,122,073 B2 | * | 11/2018 | Sano ........................ H01Q 1/38 |
| 10,481,638 B2 | * | 11/2019 | Yoshizumi .......... H04M 1/0237 |
| 2017/0184724 A1 | | 6/2017 | Aizawa |

FOREIGN PATENT DOCUMENTS

| | | |
|---|---|---|
| JP | 5703977 B2 | 4/2015 |
| JP | 5834667 B2 | 12/2015 |
| JP | 2016-040884 A | 3/2016 |
| JP | 2017-118377 A | 6/2017 |

\* cited by examiner

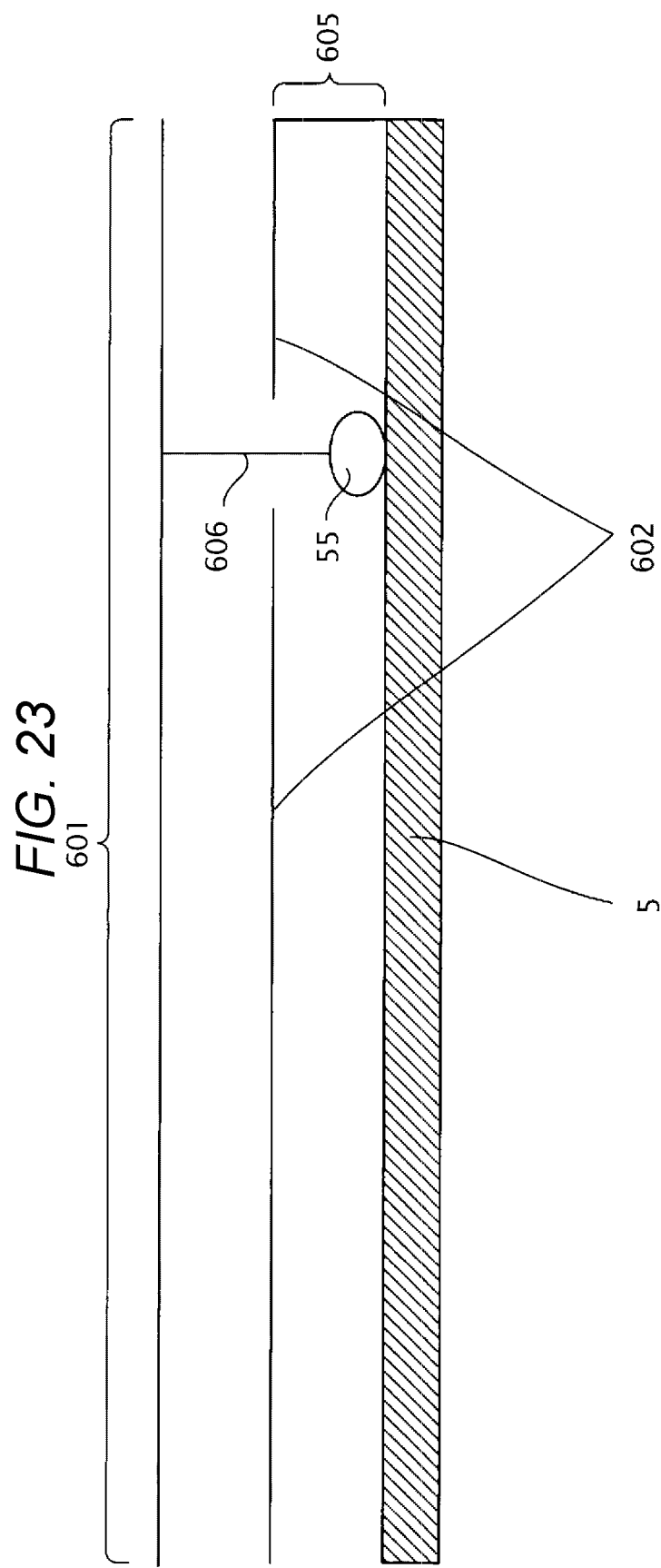

ELECTRONIC APPARATUS

CROSS-REFERENCES TO RELATED APPLICATIONS

This application claims priority to Japanese Patent Application No. 2018-042788, filed on Mar. 9, 2018, the entirety of which is herein incorporated by reference.

BACKGROUND

1. Technical Field

The present invention relates to an electronic apparatus.

2. Related Art

In a case of integrating a global positioning system (GPS) receiver in a small housing such as a wristwatch, since the housing is small, it is also necessary to minimize a volume of an antenna used for the receiver. In an electronic apparatus described in JP-A-2013-247598, an antenna including a first electrode and a second electrode is provided between a circuit substrate and a display unit. This antenna is an antenna in a plate shape.

The electronic apparatus in the related art can improve sensitivity of the antenna by thickening the antenna. However, if the antenna is thick, as a thickness of the antenna increases, a thickness of the electronic apparatus also increases.

SUMMARY

An advantage of some aspects of the invention is to improve the sensitivity of the antenna even in a case where the thickness of the electronic apparatus is maintained.

An electronic apparatus according to a preferable aspect (a first aspect) of the invention includes: a circuit substrate on which circuit components are disposed; and an antenna that includes a first electrode and a second electrode which is opposite to a surface, on which the circuit components are disposed, of the circuit substrate, and includes a projection portion protruding in a direction from the second electrode toward the circuit substrate, a top portion of the projection portion not overlapping with the circuit components in plan view along a thickness direction of the circuit substrate.

In the antenna including the first electrode and the second electrode, even if a surface of the antenna has an unevenness shape, as an average of thicknesses of the antenna is thicker, sensitivity of the antenna is improved.

Accordingly, in the aspect described above, since the projection portion of the antenna occupies a space on the surface, on which the circuit components are disposed, of the circuit substrate, it is possible to improve the sensitivity of the antenna while maintaining a thickness of the electronic apparatus.

In a preferable example (a second aspect) of the first aspect, when seen in the plan view, the projection portion surrounds the circuit components, and the projection portion is in contact with the circuit substrate.

In the aspect described above, the circuit components are surrounded by the projection portion and a top portion of the projection portion is in contact with the circuit substrate, so that the circuit components are separated from an outside. Therefore, it becomes possible to block noise from the outside.

In a preferable example (a third aspect) of the first aspect, the second electrode covers the circuit components.

In the aspect described above, since the circuit components are covered by the second electrode, the circuit components are separated from the outside. Therefore, it becomes possible to block noise from the outside.

In a preferable example (a fourth aspect) of the first aspect, the second electrode functions as an electromagnetic shield.

According to the aspect described above, since the second electrode functions as the electromagnetic shield, it becomes possible to block noise of the circuit components.

In a preferable example (a fifth aspect) of the first aspect to the fourth aspect, the antenna includes a short circuit which shunts the first electrode and the second electrode, and in a case where the antenna is divided into a first part and a second part by a virtual straight line passing through a center of a virtual straight line connecting one end and the other end of the short circuit when seen in the plan view and equally dividing an area of the antenna in half, a volume of the first part is different from a volume of the second part.

When the volume of the first part coincides with the volume of the second part, a right-handed circular-polarized wave and a left-handed circular-polarized wave are emitted as a ratio of 1:1. According to the aspect described above, since the volume of the first part is different from the volume of the second part, it becomes possible to change the ratio of emission of the right-handed circular-polarized wave to emission of the left-handed circular-polarized wave and to improve sensitivity of the antenna for the right-handed circular-polarized wave or the left-handed circular-polarized wave.

In a preferable example (a sixth aspect) of the first aspect to the fifth aspect, the circuit substrate is connected with the first electrode by a signal line, and the circuit substrate is connected with the second electrode by a ground line.

In the above aspect, it becomes possible to use a structure in which the circuit substrate is a ground plate and two conductive plates formed of the second electrode and the circuit substrate are opposed to each other, as a second antenna. Hereinafter, the second antenna is referred to as "parasitic antenna". Accordingly, in the electronic apparatus according to the above aspect, it becomes possible to receive a radio wave of a resonance frequency of the parasitic antenna and a radio wave of a resonance frequency of the antenna including the first electrode and the second electrode. Alternatively, the resonance frequency of the parasitic antenna may coincide with the resonance frequency of the antenna including the first electrode and the second electrode from each other. In this case, it becomes possible to improve sensitivity of the antenna and to further widen a bandwidth of the antenna as compared with a case where there is no parasitic antenna.

In a preferable example (a seventh aspect) of the first aspect to the fourth aspect, the circuit substrate is connected with the first electrode by a signal line, and the circuit substrate is connected with the second electrode by a ground line.

Also in the above aspect, it becomes possible to form the parasitic antenna in the same manner as the sixth aspect. Accordingly, in the electronic apparatus according to the above aspect, it becomes possible to receive a radio wave of a resonance frequency of the parasitic antenna and a radio wave of a resonance frequency of the antenna including the first electrode and the second electrode. Alternatively, the resonance frequency of the parasitic antenna may coincide with the resonance frequency of the antenna including the first electrode and the second electrode from each other. In this case, it also becomes possible to improve sensitivity of the antenna and to further widen a bandwidth of the antenna as compared with a case where there is no parasitic antenna.

In a preferable example (an eighth aspect) of the first aspect to the seventh aspect, the electronic apparatus further includes: a display unit, in which the antenna is positioned between the display unit and the circuit substrate.

In the above aspect, the projection portion of the second electrode is a surface opposite to the circuit substrate. Therefore, according to the above aspect, by flattening the surface opposite to the display unit of the antenna, it becomes possible to improve sensitivity of the antenna and to easily dispose the display unit while maintaining a thickness of the electronic apparatus.

In a preferable example (a ninth aspect) of the first aspect to the eighth aspect, the electronic apparatus is an electronic timepiece, and further includes a housing which includes an opening portion, a bottom surface portion, and a side surface portion and accommodates the circuit substrate, the antenna, and the display unit, and a light-transmissive member which covers the opening portion.

According to the above aspect, it is possible to provide the electronic timepiece which improves sensitivity of the antenna while maintaining the thickness of the electronic apparatus.

BRIEF DESCRIPTION OF THE DRAWINGS

The invention will be described with reference to the accompanying drawings, wherein like numbers reference like elements.

FIG. 23 is a simplified diagram of a wiring state according to a fifth embodiment.

DESCRIPTION OF EXEMPLARY EMBODIMENTS

Hereinafter, embodiments for the invention will be described with reference to drawings. However, in each of the drawings, dimensions and scale of each of units are appropriately different from actual ones. In addition, since the embodiments described below are appropriately specific examples of the invention, various technically preferable limitations are attached, but the scope of the invention is not limited thereto unless otherwise stated to limit the invention in the following description.

First Embodiment

Figure 1:
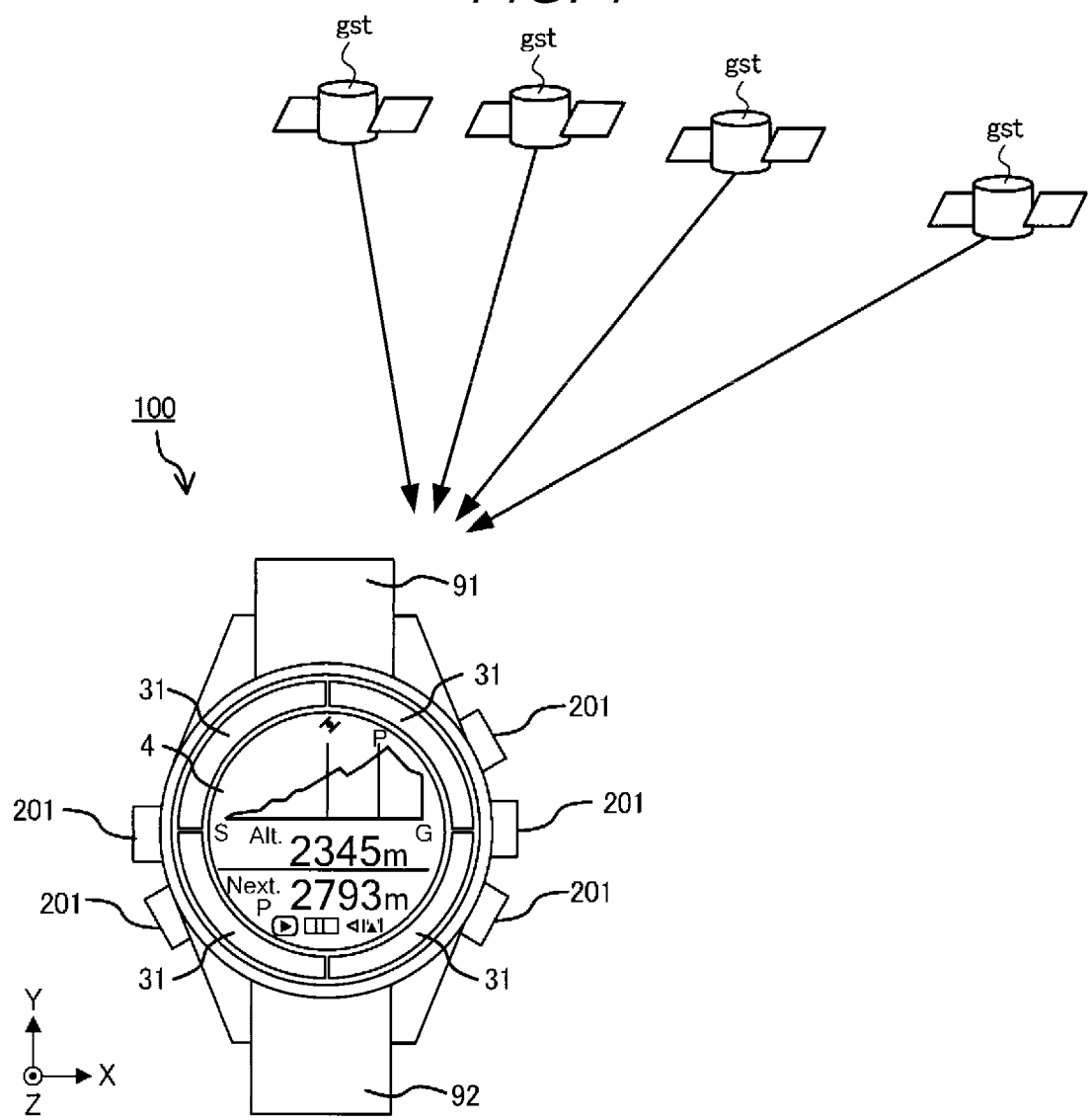
FIG. 1 is a general view schematically illustrating an example of a GPS.

FIG. 1 is a general view schematically illustrating an example of a GPS. As illustrated in FIG. 1, an electronic apparatus according to the first embodiment is an electronic timepiece 100 of an arm wearing type worn on a user's wrist or forearm. The electronic timepiece 100 has a GPS function capable of calculating a current position by a GPS receiver receiving a satellite signal transmitted from a plurality of GPS satellites gst in midair. The electronic timepiece 100 can measure, for example, a distance/velocity or a route traveled at the time of running according to position information or time information calculated by using the GPS signal, so that the electronic timepiece 100 can support an exercise of the user.

As illustrated in FIG. 1, the electronic timepiece 100 includes a display unit 4, a plurality of solar cells 31, a first band 91, a second band 92, and a plurality of buttons 201. The first band 91 and the second band 92 are respectively formed to extend in a longitudinal direction so that the first band 91 and the second band 92 can be wound around the user's wrist or forearm. The display unit 4 displays an image for representing a time or a measured data. The user presses the plurality of buttons 201, so that the electronic timepiece 100 can receive an instruction of the user. The plurality of buttons 201 are provided on a side surface of the electronic timepiece 100. In the electronic timepiece 100, a side for the user visually recognizing information such as a time or the like is defined as a front surface side of the display unit 4 and a side to be wound on the wrist or the forearm is defined as a rear surface side of the display unit 4.

In FIG. 1, a direction from a rear surface to a front surface based on a display surface of the display unit 4 is defined as a positive Z-axis direction. Two axes orthogonal to a Z-axis are defined as an X-axis and a Y-axis, and a direction from a center of the display surface to the first band 91 or the second band 92 is defined as the Y-axis and an axis orthogonal to the Z-axis and the Y-axis is defined as the X-axis. A direction from the second band 92 to the first band 91, that is, a positive Y-axis direction is defined as "12 o'clock direction". Accordingly, a negative Y-axis direction is defined as "6 o'clock direction" and a positive X-axis direction is defined as "3 o'clock direction". In addition, for simplification of description, a side in the positive Z-axis direction will be referred to as "front side" and aside in a negative Z-axis direction will be referred to as "rear side".

Figure 2:
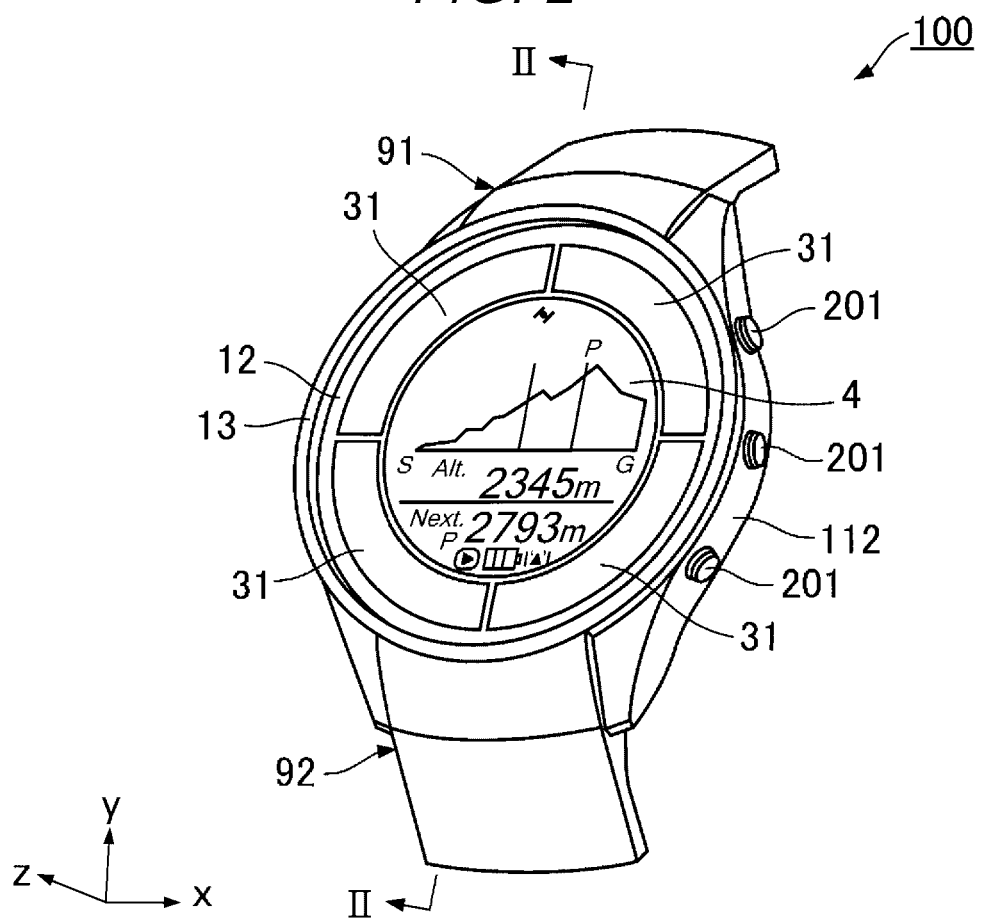
FIG. 2 is a perspective view seen from a front side of an electronic timepiece.
Figure 3:
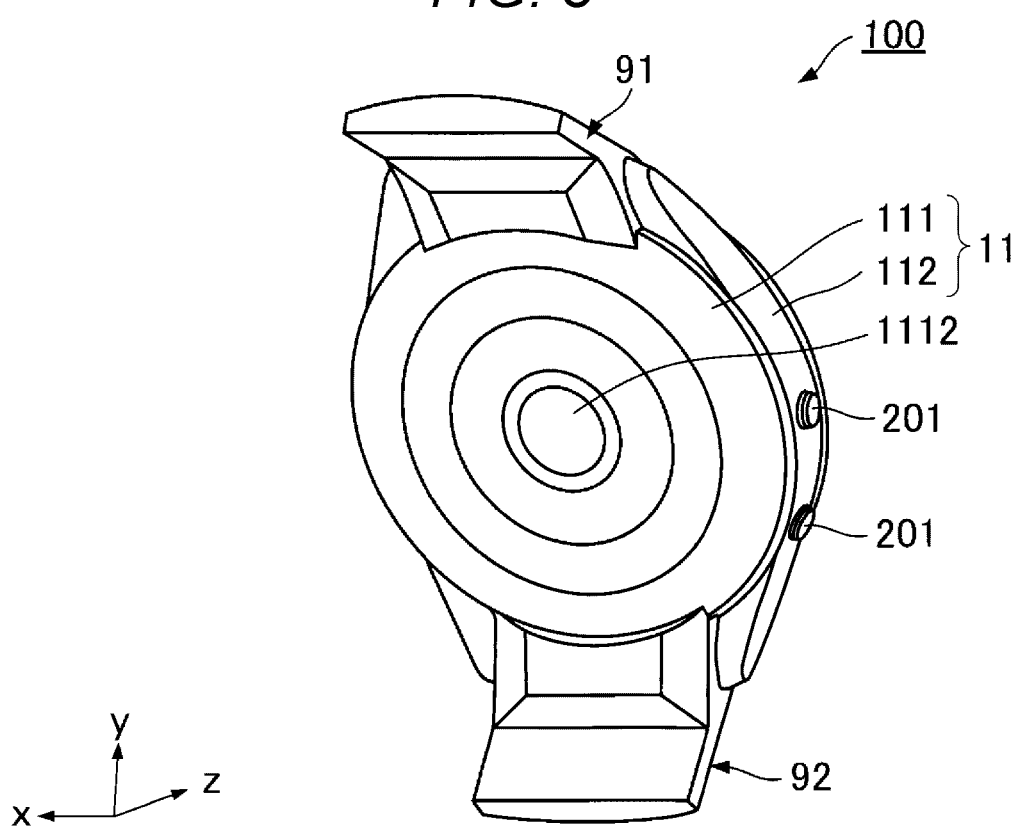
FIG. 3 is a perspective view seen from a rear side of the electronic timepiece.
Figure 4:
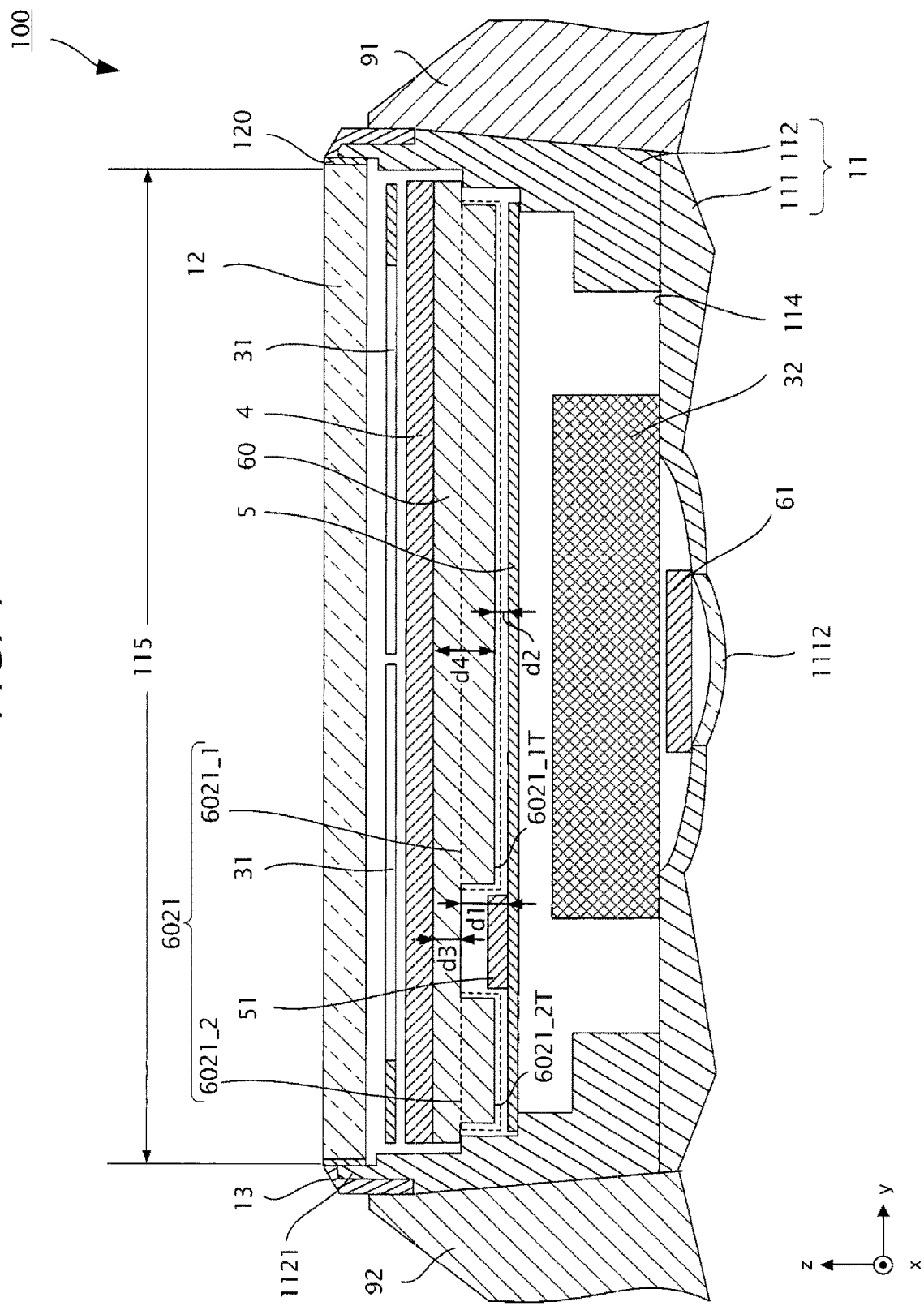
FIG. 4 is a cross-sectional view of the electronic timepiece taken along a line II-II.

FIG. 2 is a perspective view seen from a front side of the electronic timepiece 100. FIG. 3 is a perspective view seen from a rear side of the electronic timepiece 100. FIG. 4 is a cross-sectional view of the electronic timepiece 100 taken along a line II-II in FIG. 2.

As illustrated in FIGS. 2 to 4, the electronic timepiece 100 includes a circuit substrate 5, a housing 11, a light-transmissive member 12, a bezel 13, a secondary battery 32, a GPS antenna 60, and a pulse sensor 61 in addition to members and devices illustrated in FIG. 1.

Housing

The housing 11 accommodates the circuit substrate 5, the secondary battery 32, the GPS antenna 60, the solar cell 31, and the display unit 4. Further, the housing 11 includes a side surface portion 112 and a bottom surface portion 111. The housing 11 forms a recess portion 114 and an opening portion 115 by the side surface portion 112 and the bottom surface portion 111.

At a part on a front surface side of the side surface portion 112, a protrusion portion 1121 protruding in the positive Z-axis direction is formed. The protrusion portion 1121 has an annular shape when seen in plan view in a thickness direction of the circuit substrate 5 and is used for supporting the light-transmissive member 12. Hereinafter, a case of being simply described as "when seen in plan view" means a case when seen in plan view in the thickness direction of the circuit substrate 5, that is, the positive Z-axis direction. A thickness of the circuit substrate 5 is a direction perpendicular to a surface on which circuit components of the circuit substrate 5 are disposed, that is, a length in a Z-axis direction.

The bottom surface portion 111 comes into contact with the user's wrist when the user wears the electronic timepiece 100. In addition, in a central portion of the bottom surface portion 111, a window portion 1112 which protrudes toward the rear surface side than a vicinity of the central portion and has translucency allowing light of the pulse sensor 61 to enter and exit.

A material constituting the side surface portion 112 and the bottom surface portion 111 may be any material having an insulating property so as to reduce an influence on characteristics of the GPS antenna 60. For example, as the material constituting the side surface portion 112 and the bottom surface portion 111, a glass material, acrylic resin, various resin materials including plastic such as polycarbonate resin or the like can be used. Among the materials, plastic is preferably used. Accordingly, it is possible to lighten the housing 11.

Secondary Battery

The secondary battery 32 is provided on a rear side of the circuit substrate 5. The secondary battery 32 supplies a power to circuit components disposed on the circuit substrate 5 and the pulse sensor 61. A specific example of the secondary battery 32 is a lithium ion secondary battery or the like, for example.

Light-Transmissive Member

The light-transmissive member 12 is connected to the housing 11 via a seal member 120 in an annular shape formed by packing or the like. The light-transmissive member 12 has a windshield property for preventing penetration of dust or the like from an outside into an inside of the housing 11 and has transparency allowing the inside to be visually recognized from the outside. In addition, the light-transmissive member 12 has translucency allowing light from the outside to enter in the inside. The light-transmissive member 12 closes the opening portion 115. For example, as the material constituting the light-transmissive member 12, a glass material, acrylic resin, polycarbonate, or the like can be used.

Bezel

The bezel 13 has an annular shape and is engaged with the protrusion portion 1121. The bezel 13 is a fixing member for fixing the light-transmissive member 12 on the side surface portion 112. Specifically, an inner diameter on a rear surface side of the bezel 13 is formed to be approximately equal to an outer diameter of the protrusion portion 1121, and the bezel 13 prevents the protrusion portion 1121 from being formed toward an outer vicinity side. Accordingly, it is possible to stably fix the light-transmissive member 12 on the housing 11.

Circuit Substrate

The circuit substrate 5 is positioned at a center of the electronic timepiece 100 in the Z-axis direction and is provided approximately in parallel with the display unit 4. As a circuit component, for example, a micro controller unit (MCU) 51 is disposed on a surface on a front side of the circuit substrate 5. Circuit components other than the MCU 51 are also disposed on the circuit substrate 5, but in order to avoid complication of the drawing, only the MCU 51 is illustrated in FIG. 4. The MCU 51 controls driving of each of the units included in the electronic timepiece 100.

Display Unit

The display unit 4 is formed of a display panel such as a liquid crystal panel, an electronic paper panel, an organic electroluminescence panel, or the like, and is electrically connected to the circuit substrate 5 via a wiring (not illustrated) or the like. In addition, the display unit 4 has a plate shape, and is disposed between the circuit substrate 5 and the light-transmissive member 12 approximately in parallel with the circuit substrate 5 and the light-transmissive member 12. The display unit 4 can display various data and the like such as position information and the like of the electronic timepiece 100 based on the satellite signal received by the GPS antenna 60, for example.

GPS Antenna

The GPS antenna 60 is mounted on a front side of the circuit substrate 5. The GPS antenna 60 has a function of receiving the satellite signal received from the GPS satellite gst.

Figure 5:
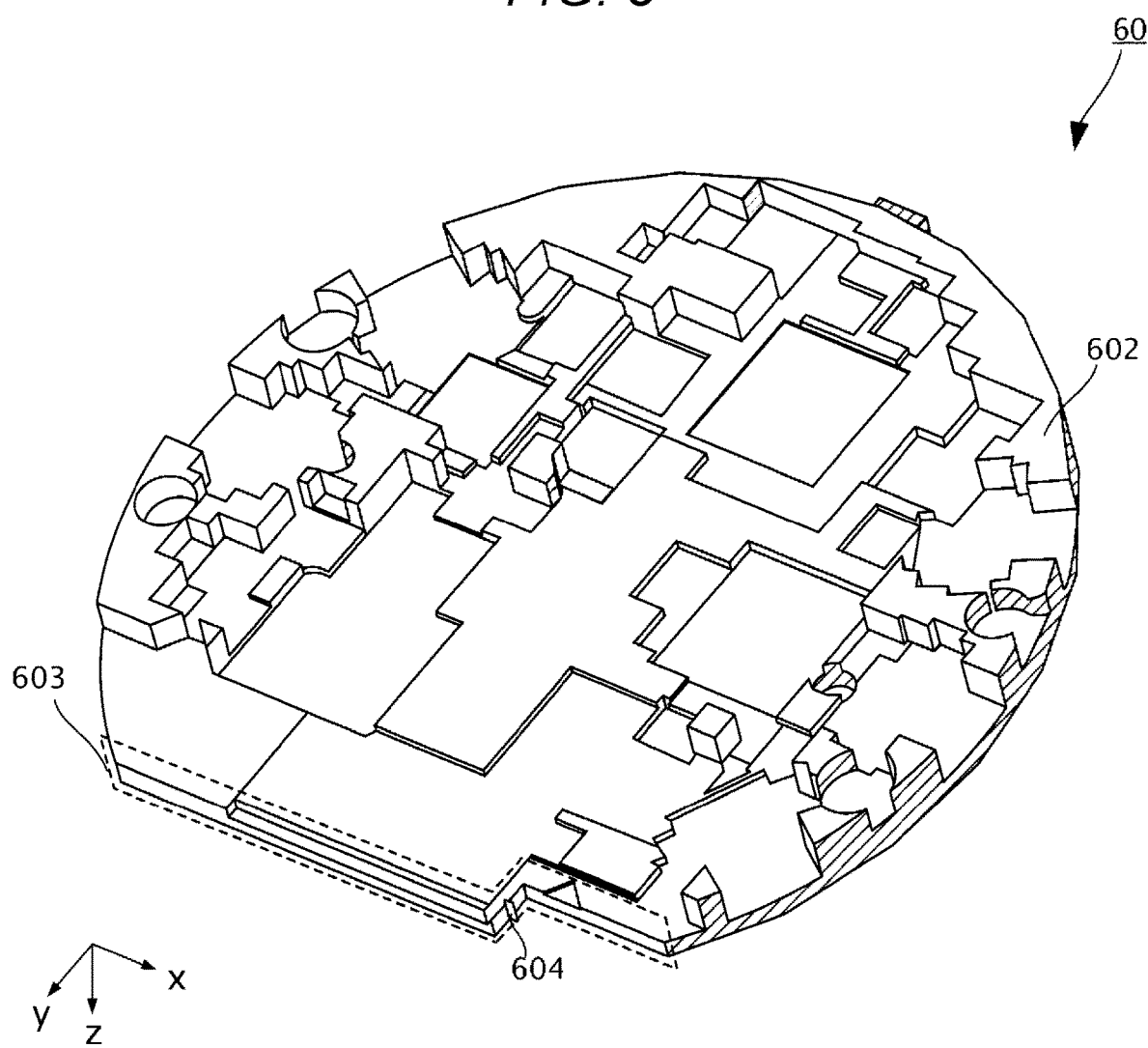
FIG. 5 is a perspective view of a rear side of a GPS antenna.
Figure 6:
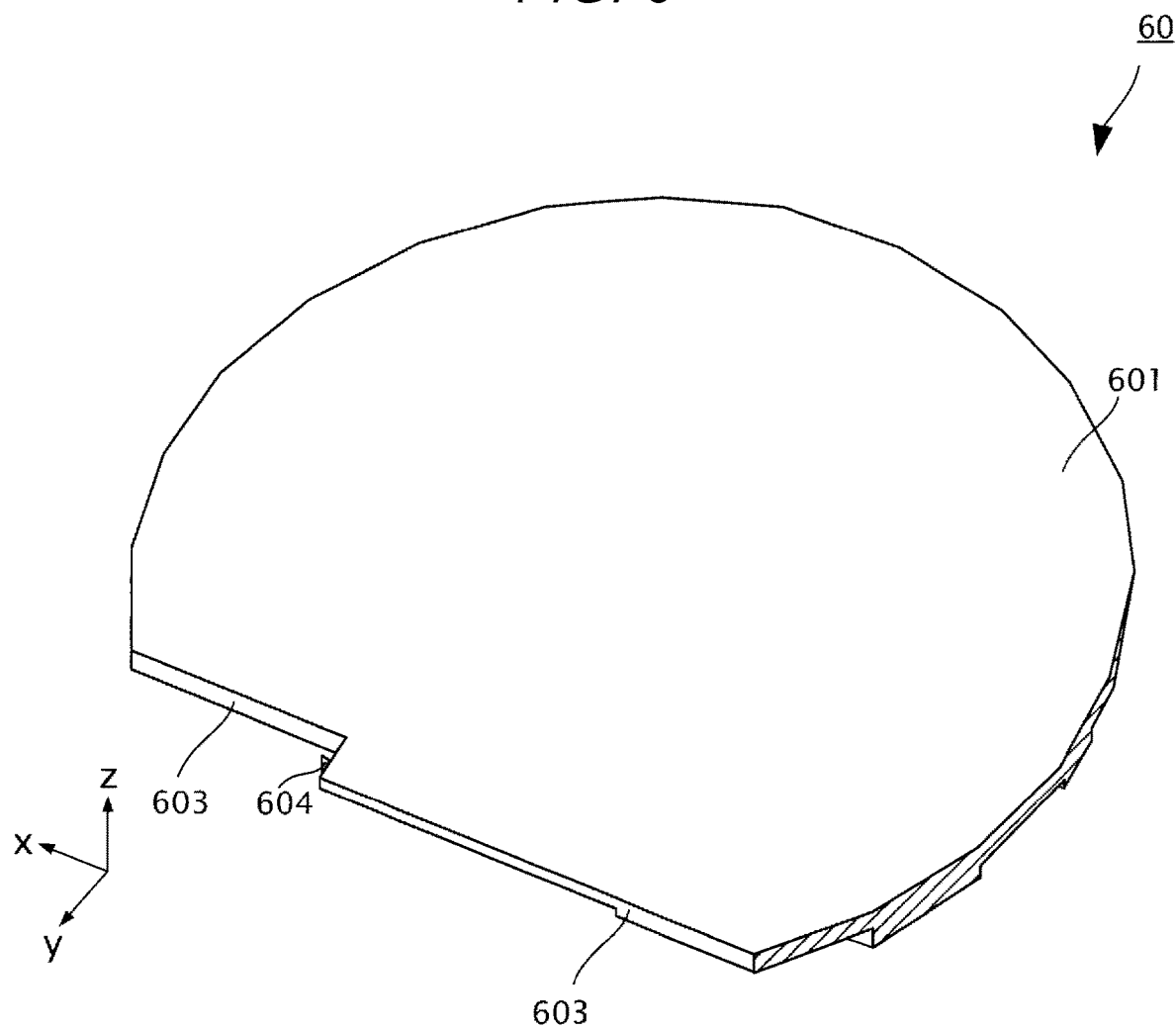
FIG. 6 is a perspective view of a front side of the GPS antenna.
Figure 7:
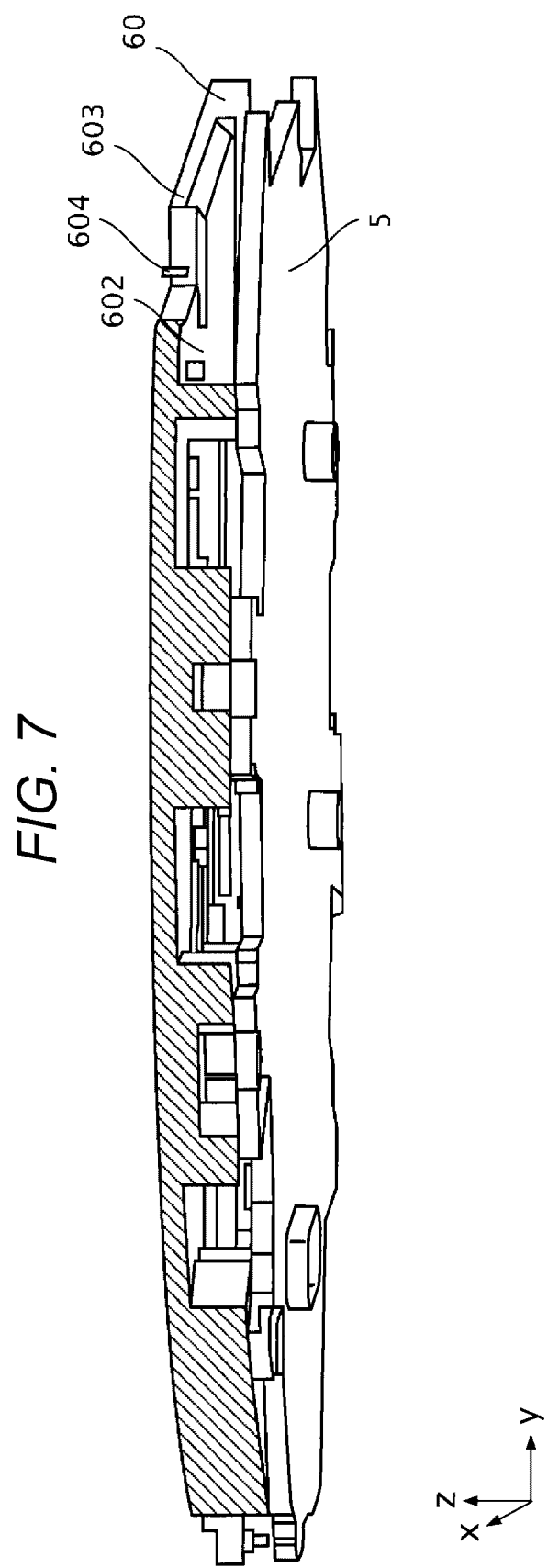
FIG. 7 is a diagram illustrating a positional relationship between the GPS antenna and a circuit substrate.

FIG. 5 is a perspective view seen from a rear side of the GPS antenna 60. FIG. 6 is a perspective view seen from a front side of the GPS antenna 60. FIG. 7 is a diagram illustrating a positional relationship between the GPS antenna 60 and the circuit substrate 5.

The GPS antenna 60 is an antenna to which an inverted F type antenna in a plate shape is applied. The GPS antenna 60 includes a first electrode 601, a second electrode 602, and a short circuit 603. The first electrode 601 is a surface on a front side and the second electrode 602 is a surface on a rear side. The short circuit 603 shunts the first electrode 601 and the second electrode 602. A power supply unit 604 supplies a power to the GPS antenna 60.

The GPS antenna 60 has a configuration in which a metal electrode is formed by plating, for example, on a core material molded from a resin having a low dielectric loss tangent. A dissipation factor of the resin as the core material is, for example, 0.0007 and a dielectric constant is 2.6. A metal used as the electrode is, for example, copper. In the GPS antenna 60 illustrated in FIGS. 5, 6, and 7, a portion without hatching is a portion plated with metal and a portion with hatching is a portion a portion not plated with metal.

Further, as illustrated in FIG. 4, the second electrode 602 includes a projection portion 6021 protruding in a direction from the second electrode 602 toward the circuit substrate 5. Details of the projection portion 6021 will be described with reference to FIGS. 4, 7, and 8.

The GPS antenna 60 illustrated in FIG. 4 includes a projection portion 6021_1 and a projection portion 6021_2, as the projection portion 6021. In the following description, in a case of distinguishing the same type of elements, reference numerals such as "projection portion 6021_1" and "projection portion 6021_2" are used, and in a case of not distinguishing the same type of the elements, only a common number such as "projection portion 6021" among the reference numerals may be used. The projection portion 6021_1 includes a top portion 6021_1T. In the same manner, the projection portion 6021_2 includes a top portion 6021_2T. A top portion 6021T is a portion having a longest lineal distance from the first electrode 601 in the projection portion 6021. The top portion 6021T may have a dotted shape, a linear shape, or a planar shape, in some cases.

Figure 8:
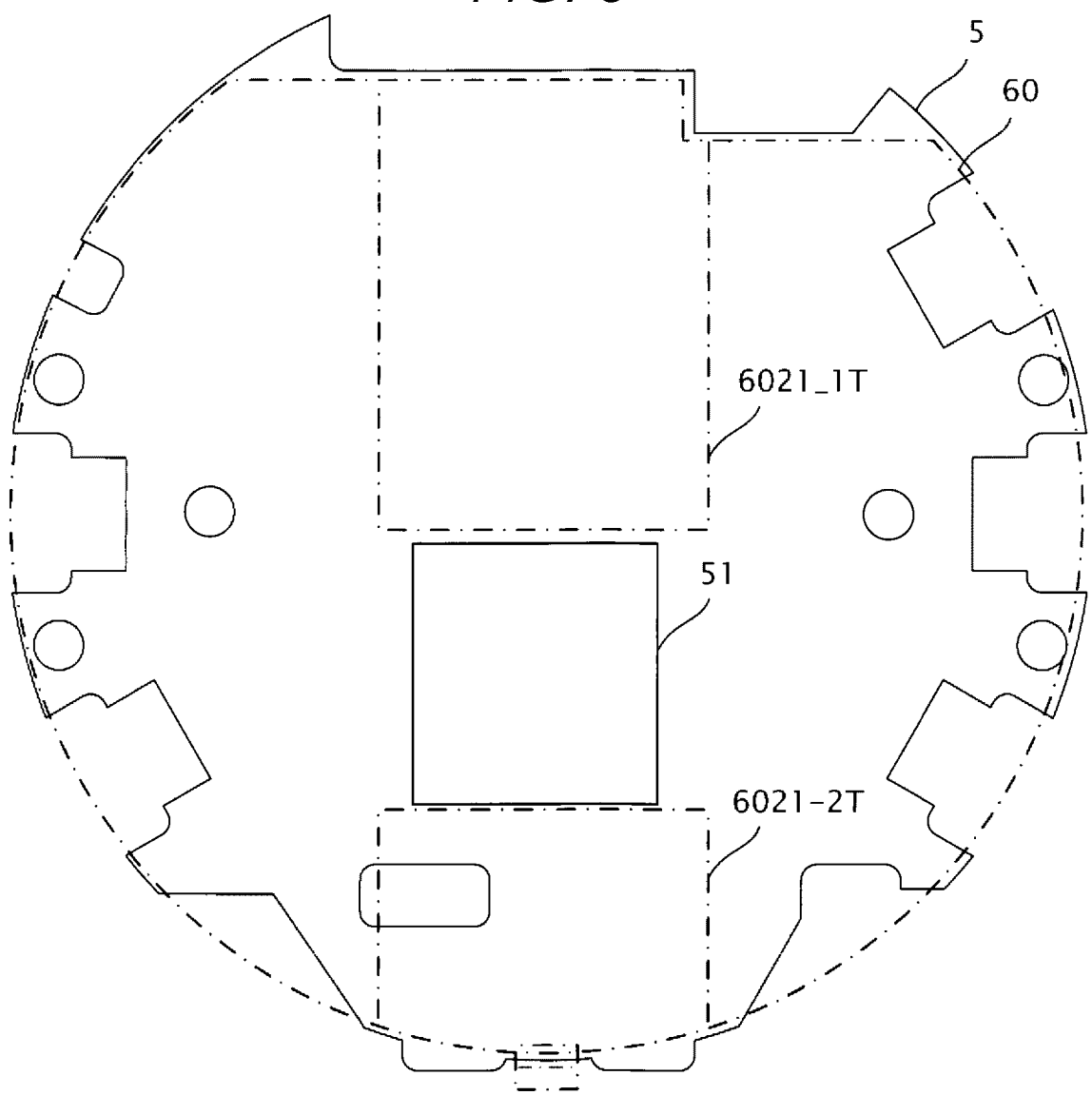
FIG. 8 is a diagram illustrating a relationship between a projection portion and circuit components in plan view.

As illustrated in FIG. 8, the circuit substrate 5 and the GPS antenna 60 are disposed so that the projection portion 6021 is in contact with the circuit substrate 5 or the projection portion 6021 is in proximity to the circuit substrate 5. A shape of the projection portion 6021 is designed so that a circuit component such as the MCU 51 or the like mounted on the circuit substrate 5 is engaged with a recess portion form in a vicinity of the MCU 51 by the projection portion 6021. In other words, the GPS antenna 60 is thickened until the GPS antenna 60 comes into contact with the circuit substrate 5, and only a portion in contact with the circuit component is penetrated. An example of a specific shape will be described with reference to FIG. 8.

FIG. 8 is a diagram illustrating a relationship between the projection portion 6021 and a circuit component in plan view. In FIG. 8, in order to avoid complication of the drawing, an outline of the GPS antenna 60 is illustrated as an alternate long and short dash line. In addition, in order to avoid complication of the drawing, FIG. 8 illustrates only a relationship between the top portion 6021_1T of the projection portion 6021_1, the top portion 6021_2T of the projection portion 6021_2, and the MCU 51 as the circuit component. When seen in plan view, each of the top portion 6021_1T and the top portion 6021_2T does not overlap with the MCU 51.

Effect of First Embodiment

In the inverted F type antenna in a plate shape, even if the antenna has an unevenness shape, as an average of thicknesses of the antenna is thicker, sensitivity of the antenna is improved. A reason why the sensitivity is improved as the antenna is thick is that a current in a direction opposite to a current flowing through the second electrode flows through the first electrode, so that if the antenna becomes thin, the current flowing through the first electrode and the current flowing through the second electrode are canceled out each other and if the antenna becomes thick, the amount of canceled currents decreases.

In the present embodiment, as illustrated in FIGS. 4, 7, and 8, the second electrode 602 includes the projection portion 6021 toward the circuit substrate 5, and when seen in plan view, the top portion 6021T does not overlap with the circuit components. In other words, as illustrated in FIG. 4, a shortest distance d1 from the second electrode 602 of an area, in which the circuit components are disposed on the circuit substrate 5, to the circuit substrate 5 is longer than a longest distance d2 from the top portion 6021T to the circuit substrate 5. Further, in other words, as illustrated in FIG. 4, a shortest distance d3 from the first electrode 601 to the second electrode 602 of an area, in which the circuit components are disposed on the circuit substrate 5, is longer than a longest distance d4 from the top portion 6021T to the first electrode 601.

As described above, since the projection portion 6021 occupies a space on a surface of the circuit substrate 5 on which the circuit component such as the MCU 51 or the like is disposed, it is possible to improve the sensitivity of the GPS antenna 60 while maintaining a thickness of the electronic timepiece 100. In addition, in a case where there is no projection portion 6021, the space on the surface of the circuit substrate 5 on which the circuit component such as the MCU 51 or the like is disposed becomes a useless space in which other components cannot be disposed. However, when the projection portion 6021 occupies the space, it becomes possible to efficiently use the useless space.

As a specific effect, in a case of measuring sensitivity of a GPS antenna 60 having a maximum thickness of 2.25 mm and a minimum thickness of 0.75 mm and a GPS antenna 60 without the projection portion 6021 as a comparative example by using an actual instrument, an improved amount of 1.3 dB in sensitivity is obtained.

In addition, as described above, the electronic timepiece 100 includes the housing 11 which accommodates the circuit substrate 5, the GPS antenna 60, and the display unit 4 and the light-transmissive member 12. As described above, in the first embodiment, it is possible to provide the electronic timepiece 100 which improves sensitivity of the GPS antenna 60 while maintaining the thickness of the electronic timepiece 100.

Second Embodiment

In the second embodiment, the GPS antenna 60 also has a function as a shielding case of the circuit substrate 5. In other words, the GPS antenna 60 also has a function as an electromagnetic shield of the circuit substrate 5. Hereinafter, the second embodiment will be described. In embodiments and modification examples below, the same components as the effect or the function of the first embodiment are denoted by the same reference numerals as the first embodiment and a detail description thereof will be appropriately omitted. Further, since the description of the components to be described below will be omitted, unless otherwise described, it is assumed that the component is a component related to the second embodiment.

Figure 9:
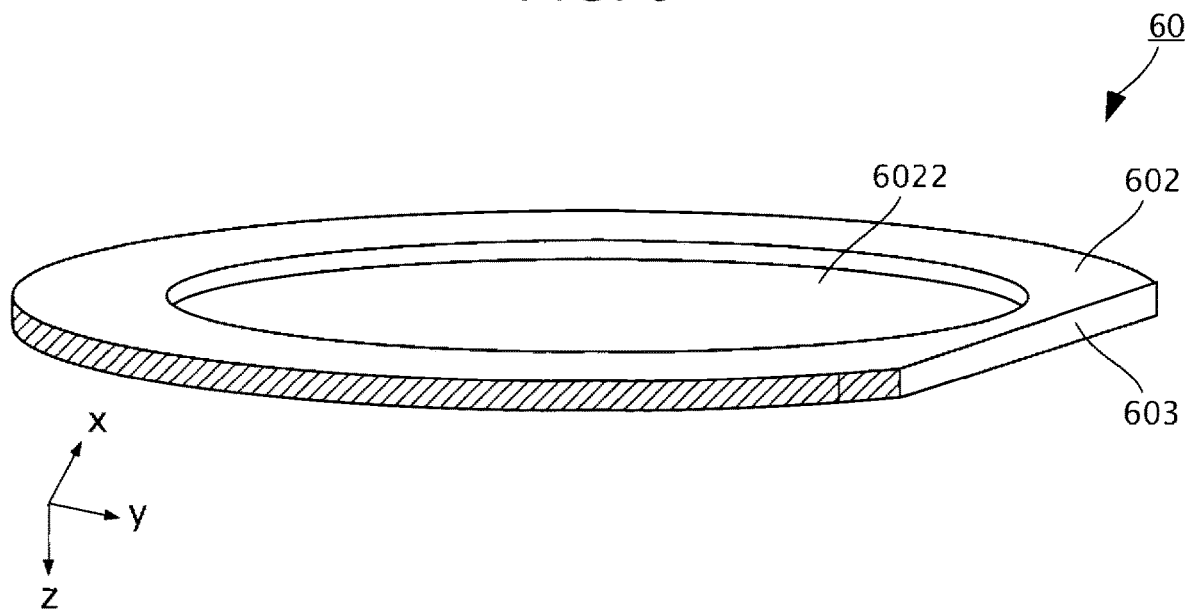
FIG. 9 is a perspective view of a rear side of a GPS antenna according to a second embodiment.
Figure 10:
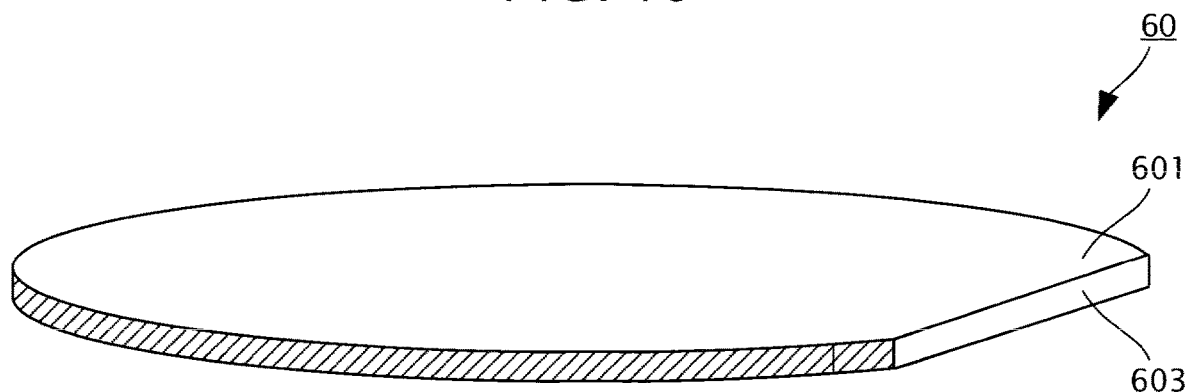
FIG. 10 is a perspective view of a front side of the GPS antenna according to the second embodiment.
Figure 11:
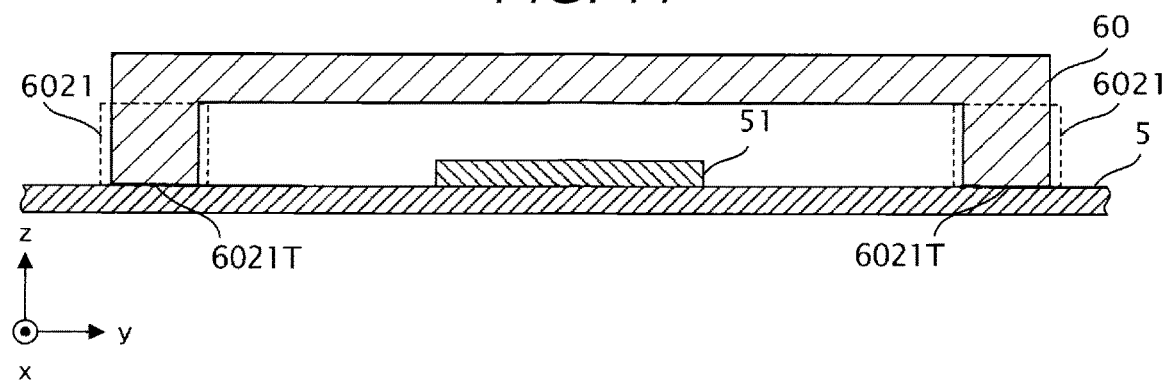
FIG. 11 is a diagram illustrating a part of a cross section of the electronic timepiece taken along the line II-II.
Figure 12:
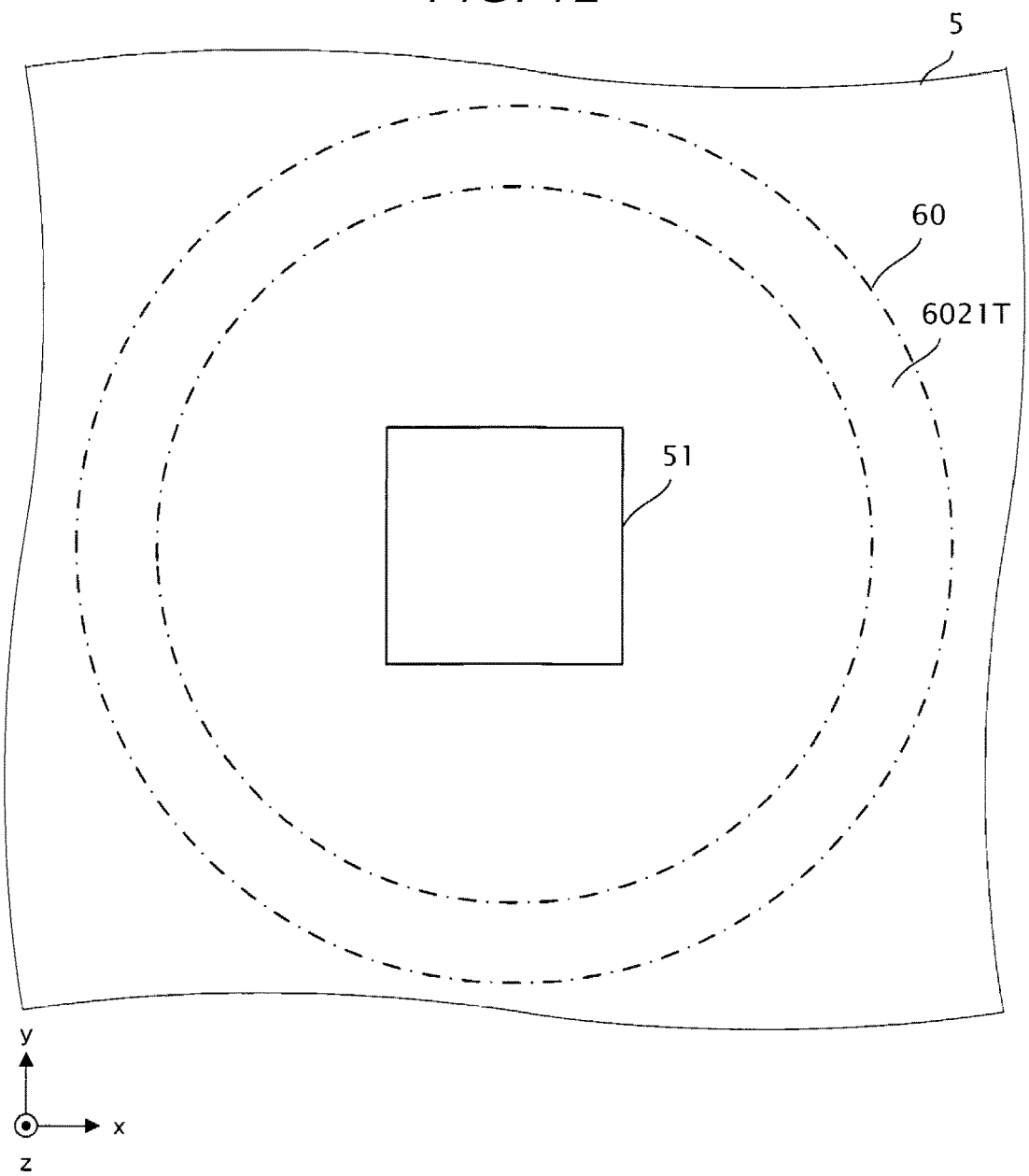
FIG. 12 is a diagram illustrating a positional relationship between the GPS antenna and the circuit substrate when seen in plan view.

FIG. 9 is a perspective view of a rear side of the GPS antenna 60. FIG. 10 is a perspective view of a front side of the GPS antenna 60. FIG. 11 is a diagram illustrating a part of a cross section of the electronic timepiece 100 taken along the line II-II in FIG. 2. FIG. 12 is a diagram illustrating a positional relationship between the GPS antenna 60 and the circuit substrate 5 when seen in plan view. In the same manner as the first embodiment, in the GPS antenna 60 illustrated in FIGS. 9 and 10, a portion without hatching is a portion plated with metal and a portion with hatching is a portion a portion not plated with metal. In addition, in FIG. 12, in order to avoid complication of the drawing, an outline of the GPS antenna 60 is illustrated as an alternate long and short dash line.

As illustrated in FIGS. 9 and 11, in the GPS antenna 60, an opposed surface in contact with the circuit substrate 5 has a tray shape, and a recess portion 6022 is formed by an edge of the tray, that is, the projection portion 6021. The top portion 6021T of the projection portion 6021 is in contact with the circuit substrate 5. In addition, as illustrated in FIG. 12, when seen in plan view, the top portion 6021T of the projection portion 6021 of the GPS antenna 60 surrounds circuit components such as the MCU 51 and the like. In other words, the GPS antenna 60 surrounds the circuit components such as the MCU 51 and the like by the recess portion 6022.

Further, by bringing the projection portion 6021 of the GPS antenna 60 into contact with a metal layer of the circuit substrate 5, the GPS antenna 60 can be more appropriately operated as a shielding case. The metal layer of the circuit substrate 5 may be formed on the circuit substrate 5 as a metal layer different from the wiring. With such a configuration, the function of the GPS antenna 60 as a shielding case can be improved as compared with a case where the GPS antenna 60 is not brought into contact with the metal layer of the circuit substrate 5.

Effect of Second Embodiment

As illustrated in FIGS. 11 and 12, the circuit components such as the MCU 51 and the like are surrounded by the projection portion 6021 and the top portion 6021T of the projection portion 6021 is in contact with the circuit substrate 5. Accordingly, since the circuit components such as the MCU 51 and the like are separated from the outside, it is possible to reduce noise from the outside. As described above, the GPS antenna 60 can have a function as a shielding case of the circuit substrate 5. In particular, since the GPS antenna 60 is in proximity to circuit components which are sources of the noise, the function as the shielding case is important. A first reason why the shielding case is important is that various electromagnetic wave noises including a clock signal of a digital circuit occur in the circuit substrate 5 and if the electromagnetic wave noise is incident to the GPS antenna 60, sensitivity of the GPS antenna 60 is deteriorated. A second reason why the shielding case is important is that in a case where a power obtained by amplifying a signal received by the GPS antenna 60 is emitted from the circuit substrate 5 and the GPS antenna 60 receives the power, a receive amplifier oscillates, so that the sensitivity of the GPS antenna 60 is deteriorated.

By the GPS antenna 60 according to the second embodiment completely covering the circuit components such as the MCU 51 and the like, it is possible to theoretically reduce an influence of the circuit noise to zero. If there is a gap between the GPS antenna 60 and the circuit substrate 5, an external noise may enter an area partitioned by the GPS antenna 60 and the circuit substrate 5 according to a principle of a slot antenna. Alternatively, an electronic circuit noise (for example, an electromagnetic wave) due to the circuit components such as the external MCU 51 and the like leaks to the outside, which is received by the GPS antenna 60, and which may cause deterioration in sensitivity at the time of reception.

Third Embodiment

In the inverted F type antenna in a plate shape, a right-handed circular-polarized wave and a left-handed circular-polarized wave are emitted as a ratio of 1:1. When a shape of the GPS antenna 60 is bilaterally asymmetric based on an imaginary straight line connecting a center of the short circuit 603 and a center of the display unit 4 by penetrating through the GPS antenna 60, it is possible to change the ratio of emission of the right-handed circular-polarized wave to emission of the left-handed circular-polarized wave. Hereinafter, the third embodiment will be described. In embodiments and modification examples below, the same components as the effect or the function of the first embodiment or the second embodiment are denoted by the same reference numerals as the first embodiment or the second embodiment and a detail description thereof will be appropriately omitted. Further, since the description of the components to be described below will be omitted, unless otherwise described, it is assumed that the component is a component related to the third embodiment.

Hereinafter, in the third embodiment, a first shape to a fourth shape of the GPS antenna 60 will be illustrated by using FIGS. 13 to 16 and whether the right-handed circular-polarized wave has predominance or the left-handed circular-polarized wave has predominance in each of shapes will be described. When the right-handed circular-polarized wave has predominance, it means that the right-handed circular-polarized wave is largely emitted than the left-handed circular-polarized wave. When the left-handed circular-polarized wave has predominance, it means that the left-handed circular-polarized wave is largely emitted than the right-handed circular-polarized wave. In the following description, the case where the right-handed circular-polarized wave has predominance is simply referred to as "right-handed predominance" and the case where the left-handed circular-polarized wave has predominance is simply referred to as "left-handed predominance". In the GPS antenna 60 illustrated in FIGS. 13, 14, 15, and 16, a portion without hatching is a portion plated with metal and a portion with hatching is a portion a portion not plated with metal.

Figure 13:
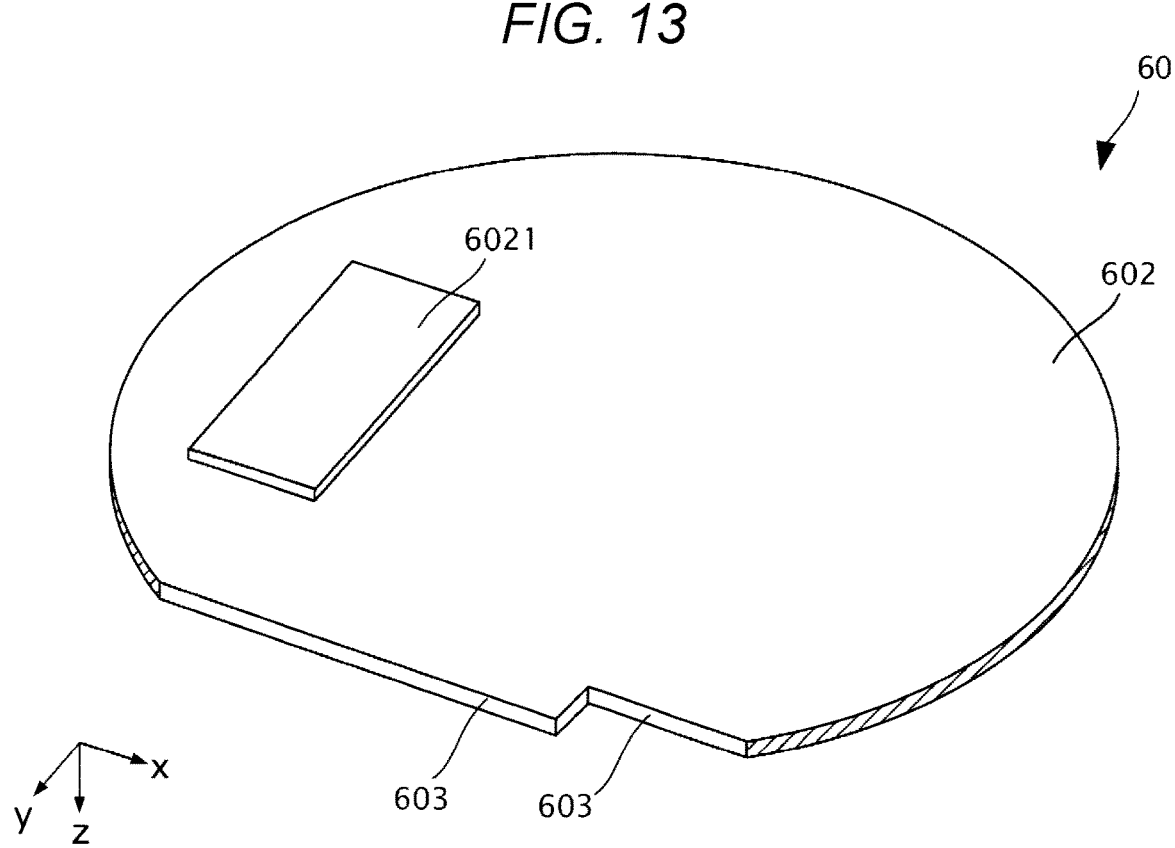
FIG. 13 is a diagram illustrating a first shape of the GPS antenna.

FIG. 13 is a diagram illustrating the first shape of the GPS antenna 60. The first shape of the GPS antenna 60 includes the projection portion 6021 at a 9 o'clock position on a rear side of the GPS antenna 60. The first shape of the GPS antenna 60 has right-handed predominance.

Figure 14:
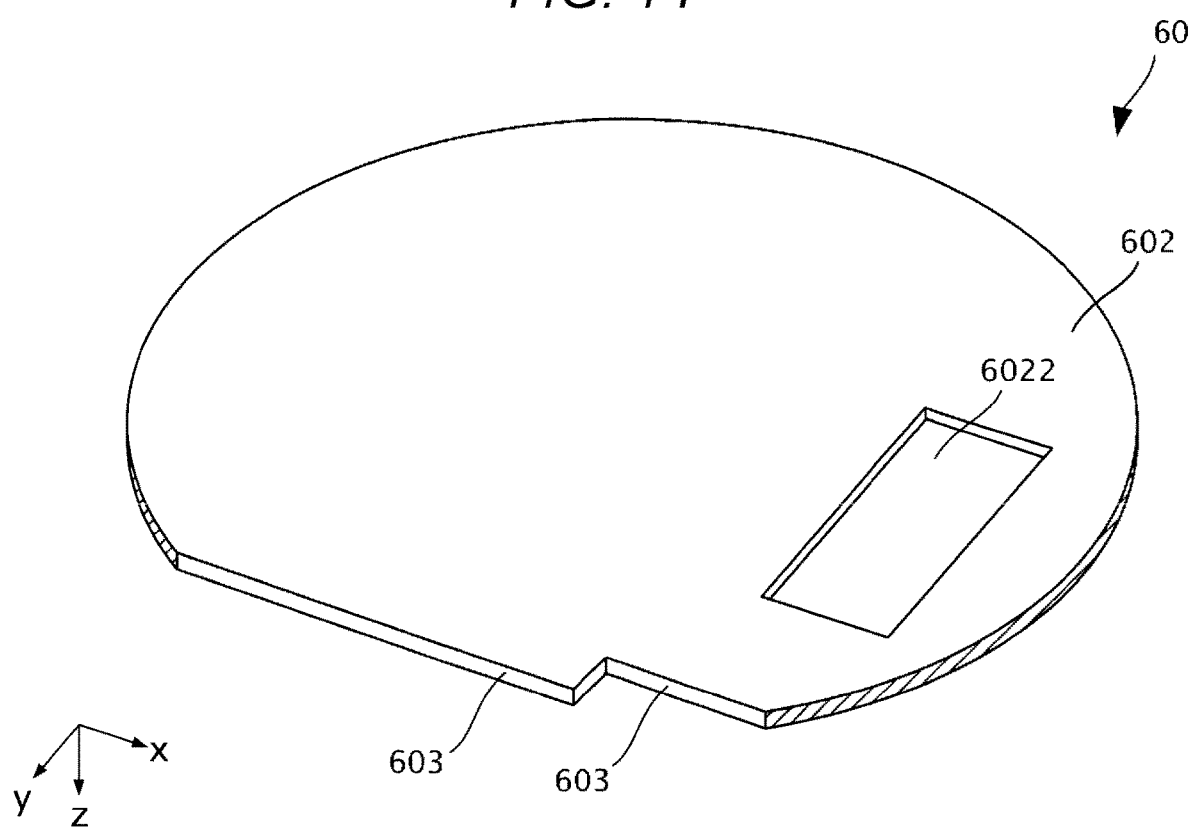
FIG. 14 is a diagram illustrating a second shape of the GPS antenna.

FIG. 14 is a diagram illustrating the second shape of the GPS antenna 60. The second shape of the GPS antenna 60 includes the recess portion 6022 at a 3 o'clock position on the rear side of the GPS antenna 60. In other words, the recess portion 6022 is a portion in which a part other than the recess portion 6022 is a projection portion. The second shape of the GPS antenna 60 has right-handed predominance.

Figure 15:
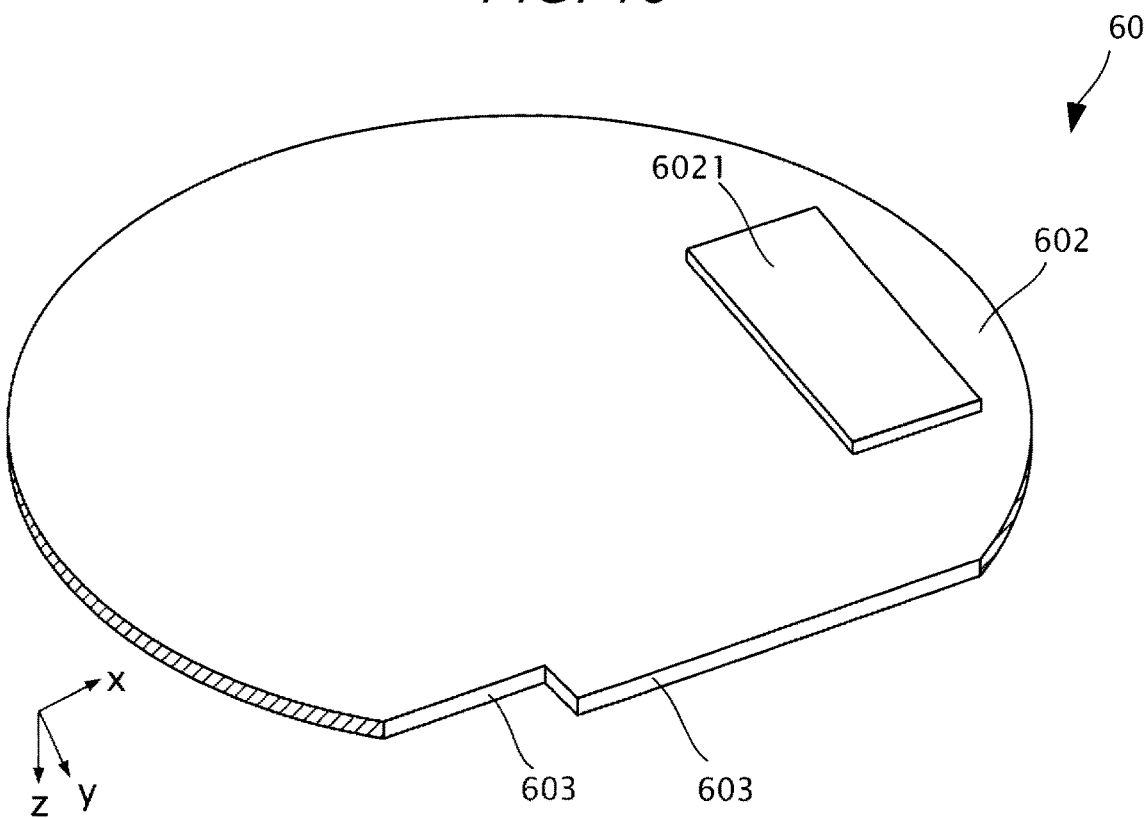
FIG. 15 is a diagram illustrating a third shape of the GPS antenna.

FIG. 15 is a diagram illustrating the third shape of the GPS antenna 60. The third shape of the GPS antenna 60 includes the projection portion 6021 at a 3 o'clock position on a rear side of the GPS antenna 60. The third shape of the GPS antenna 60 has left-handed predominance.

Figure 16:
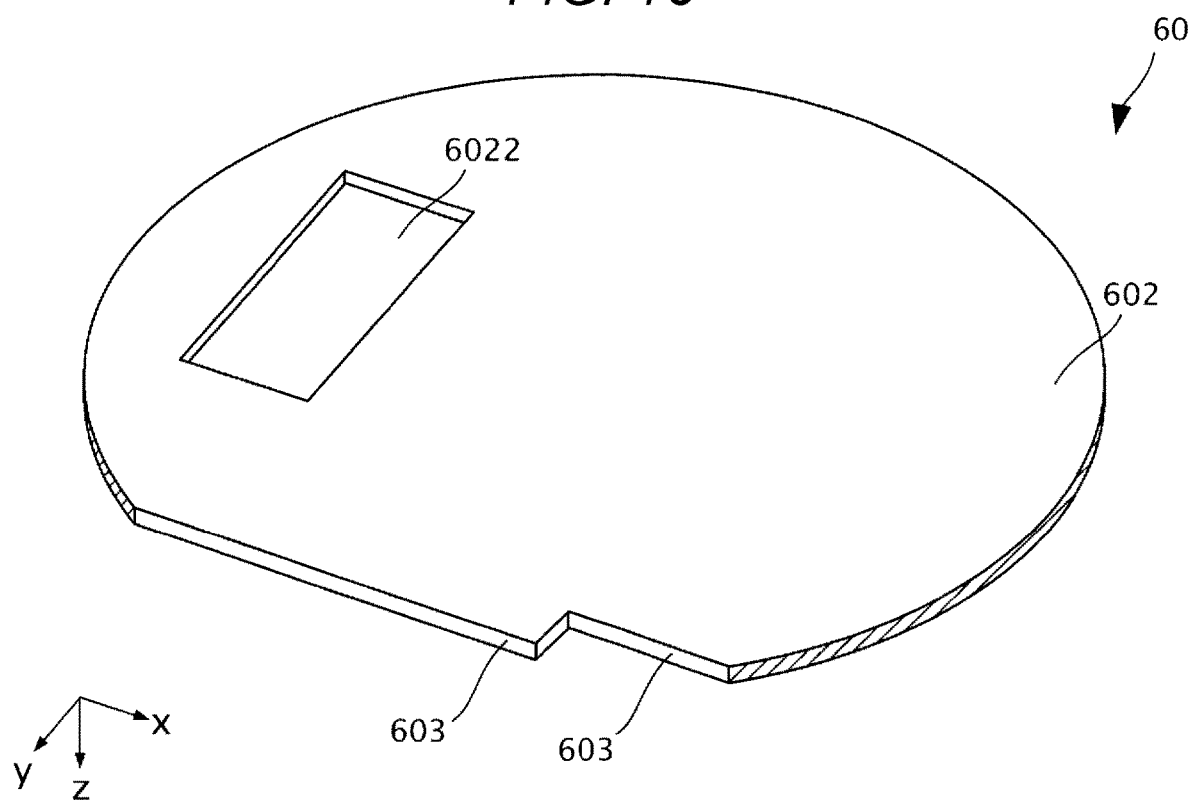
FIG. 16 is a diagram illustrating a fourth shape of the GPS antenna.

FIG. 16 is a diagram illustrating the fourth shape of the GPS antenna 60. The fourth shape of the GPS antenna 60 includes the recess portion 6022 at a 9 o'clock position on the rear side of the GPS antenna 60. The fourth shape of the GPS antenna 60 has left-handed predominance.

Effect of Third Embodiment

Figure 17:
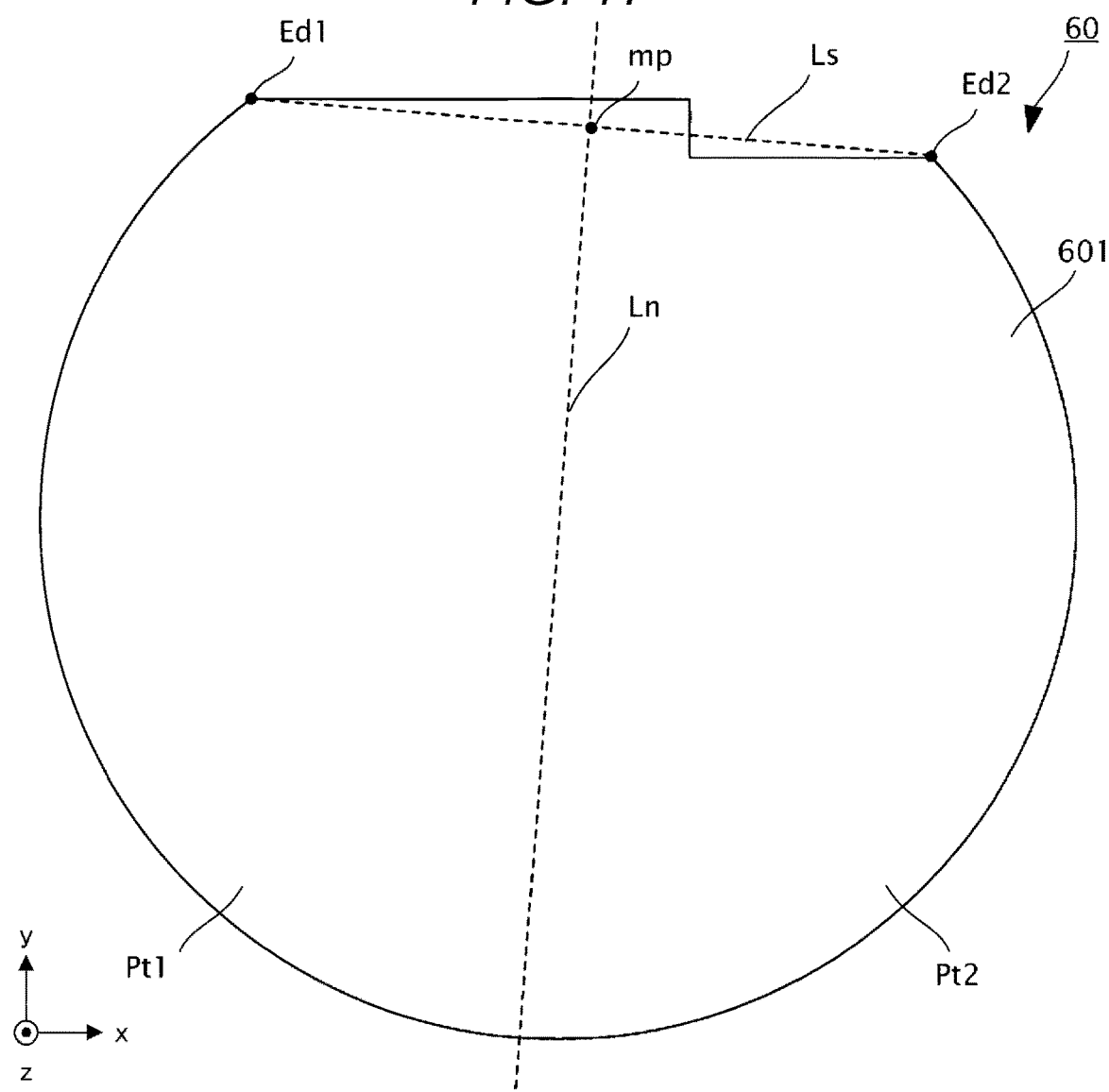
FIG. 17 is a diagram illustrating a relationship of a shape and predominance of a circular polarized wave in the GPS antenna.

FIG. 17 is a diagram illustrating a relationship of a shape and predominance of a circular polarized wave in the GPS antenna 60. FIG. 17 illustrates the GPS antenna 60 when seen in plan view. As illustrated in FIG. 17, the GPS antenna 60 has a shape including an arc. A line segment Ls illustrated in FIG. 17 is a line segment connecting both ends the arc of the GPS antenna 60, that is, an end portion Ed1 and an end portion Ed2. In other words, the end portion Ed1 is one end of the short circuit 603 and the end portion Ed2 is the other end of the short circuit 603. When seen in plan view, the GPS antenna 60 is equally divided into a first part Pt1 and a second part Pt2 by a virtual straight line Ln passing through a center of the line segment Ls so that an area of the GPS antenna 60 is equally divided in half. The first part Pt1 is a part including a 9 o'clock direction and the second part Pt2 is apart including a 3 o'clock direction. Since the projection portion 6021 or the recess portion 6022 exists in the GPS antenna 60, a volume of the first part Pt1 is different from a volume of the second part Pt2. For example, in the GPS antenna 60 illustrated in FIG. 13, since the projection portion 6021 exists, the volume of the first part Pt1 is larger than the volume of the second part Pt2.

Figure 18:
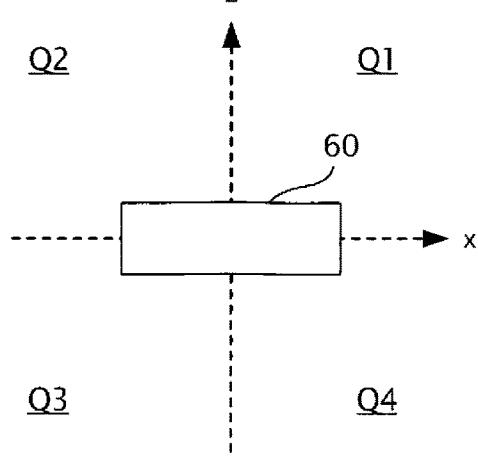
FIG. 18 is a diagram illustrating a relationship of unevenness and the predominance of the circular polarized wave in the GPS antenna.

FIG. 18 is a diagram illustrating a relationship of unevenness and predominance of the circular polarized wave in the GPS antenna 60. The GPS antenna 60 illustrated in FIG. 18 illustrates the GPS antenna 60 without an unevenness shape. In a case of the GPS antenna 60 without the unevenness shape, a right-handed circular-polarized wave and a left-handed circular-polarized wave are emitted as a ratio of 1:1. As illustrated in FIG. 18, predominance of the circular polarized wave will be described by dividing the GPS antenna 60 into a first quadrant Q1, a second quadrant Q2, a third quadrant Q3, and a fourth quadrant Q4 in an XZ plane. The GPS antenna 60 in the first quadrant Q1 and the third quadrant Q3 emits a right-handed circular-polarized wave and the GPS antenna 60 in the second quadrant Q2 and the fourth quadrant Q4 emits a left-handed circular-polarized wave. In the GPS antenna 60, as an electric field of a thick part increases, a circular polarized wave of the thick part has predominance.

For example, the GPS antenna 60 illustrated in FIG. 13 has a shape in which a part of the third quadrant Q3 becomes thick. Accordingly, since an emission quantity of the right-handed circular-polarized wave increases, the entire GPS antenna 60 has right-handed predominance. When the GPS antenna 60 illustrated in FIG. 13 is divided into the first part Pt1 and the second part Pt2, the volume of the first part Pt1 is larger than the volume of the second part Pt2.

The GPS antenna 60 illustrated in FIG. 14 has a shape in which a part of the fourth quadrant Q4 becomes thin. Accordingly, since an emission quantity of the left-handed circular-polarized wave decreases, the entire GPS antenna 60 has right-handed predominance. When the GPS antenna 60 illustrated in FIG. 14 is divided into the first part Pt1 and the second part Pt2, the volume of the first part Pt1 is larger than the volume of the second part Pt2.

The GPS antenna 60 illustrated in FIG. 15 has a shape in which a part of the fourth quadrant Q4 becomes thick. Accordingly, since an emission quantity of the left-handed circular-polarized wave increases, the entire GPS antenna 60 has left-handed predominance. When the GPS antenna 60 illustrated in FIG. 15 is divided into the first part Pt1 and the second part Pt2, the volume of the second part Pt2 is larger than the volume of the first part Pt1.

The GPS antenna 60 illustrated in FIG. 16 has a shape in which a part of the third quadrant Q3 becomes thin. Accordingly, since an emission quantity of the right-handed circular-polarized wave decreases, the entire GPS antenna 60 has left-handed predominance. When the GPS antenna 60 illustrated in FIG. 16 is divided into the first part Pt1 and the second part Pt2, the volume of the second part Pt2 is larger than the volume of the first part Pt1. As described above, by providing the unevenness portion in the second electrode 602, in the case where the volume of the first part Pt1 is larger than the volume of the second part Pt2, the GPS antenna 60 has right-handed predominance and in the case where the volume of the second part Pt2 is larger than the volume of the first part Pt1, the GPS antenna 60 has left-handed predominance.

For example, in the GPS antenna 60 illustrated in FIG. 13, a right-handed circular-polarized wave and a left-handed circular-polarized wave are emitted as a ratio of 100:96. Since the GPS antenna 60 has right-handed predominance, it becomes possible to easily receive the right-handed circular-polarized wave. Since the GPS signal is the right-handed circular-polarized wave, the GPS antenna 60 illustrated in FIG. 13 and the GPS antenna 60 illustrated in FIG. 14 can easily receive the GPS signal.

Fourth Embodiment

In the fourth embodiment, it becomes possible to transmit and receive a resonance frequency of an antenna formed by a surface of the circuit substrate 5 opposite to the GPS antenna 60 and a surface of the GPS antenna 60 opposite to the circuit substrate 5. Hereinafter, the surface of the circuit substrate 5 opposite to the GPS antenna 60 or the surface of the GPS antenna 60 opposite to the circuit substrate 5 is referred to as "parasitic antenna". Hereinafter, the fourth embodiment will be described. In embodiments and modification examples below, the same components as the effect or the function of the first embodiment, the second embodiment, or the third embodiment are denoted by the same reference numerals as the first embodiment, the second embodiment, or the third embodiment and a detail description thereof will be appropriately omitted. Further, since the description of the components to be described below will be omitted, unless otherwise described, it is assumed that the component is a component related to the fourth embodiment.

Figure 19:
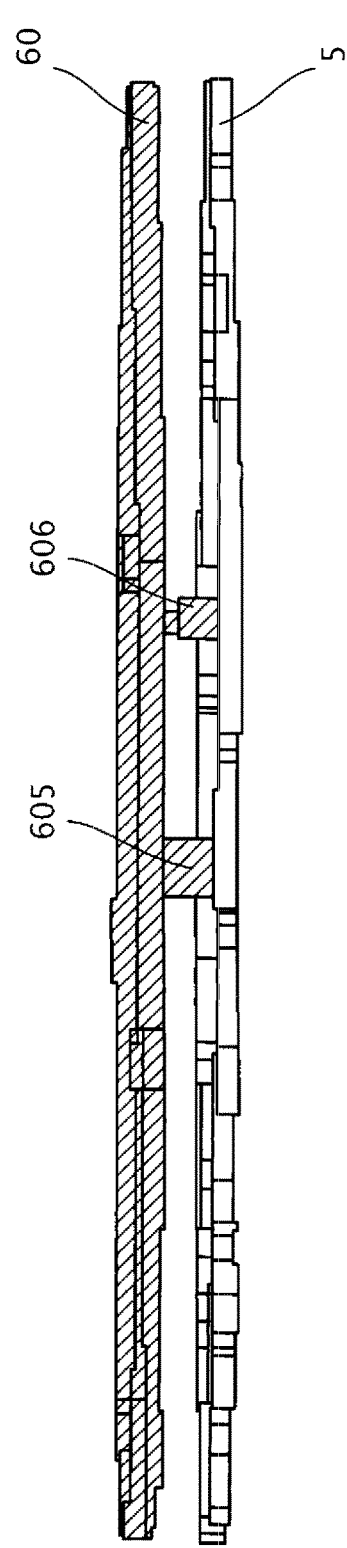
FIG. 19 is a diagram illustrating a relationship between the GPS antenna and the circuit substrate.

FIG. 19 is a diagram illustrating a relationship between the GPS antenna 60 and the circuit substrate 5. The GPS antenna 60 is connected with the circuit substrate 5 by a ground line 605 and a signal line 606. The ground line 605 is a conductor connected to a ground (GND). The signal line 606 is a conductor to which a signal is transmitted and by which the signal is received.

Figure 20:
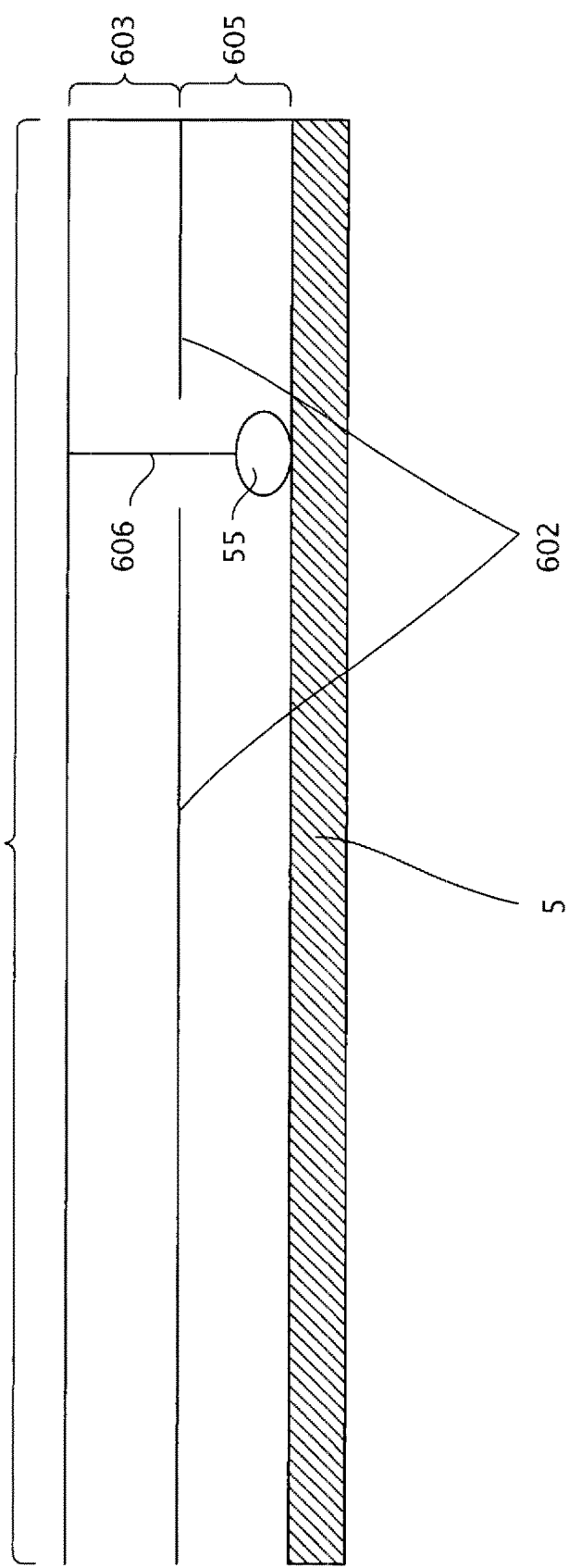
FIG. 20 is a simplified diagram of a wiring state of the GPS antenna and the circuit substrate.

FIG. 20 is a simplified diagram of a wiring state of the GPS antenna 60 and the circuit substrate 5. As illustrated in FIG. 20, the circuit substrate 5 is connected to the first electrode 601 by the signal line 606. Further, the circuit substrate 5 is connected to the second electrode 602 by the ground line 605.

Figure 21:
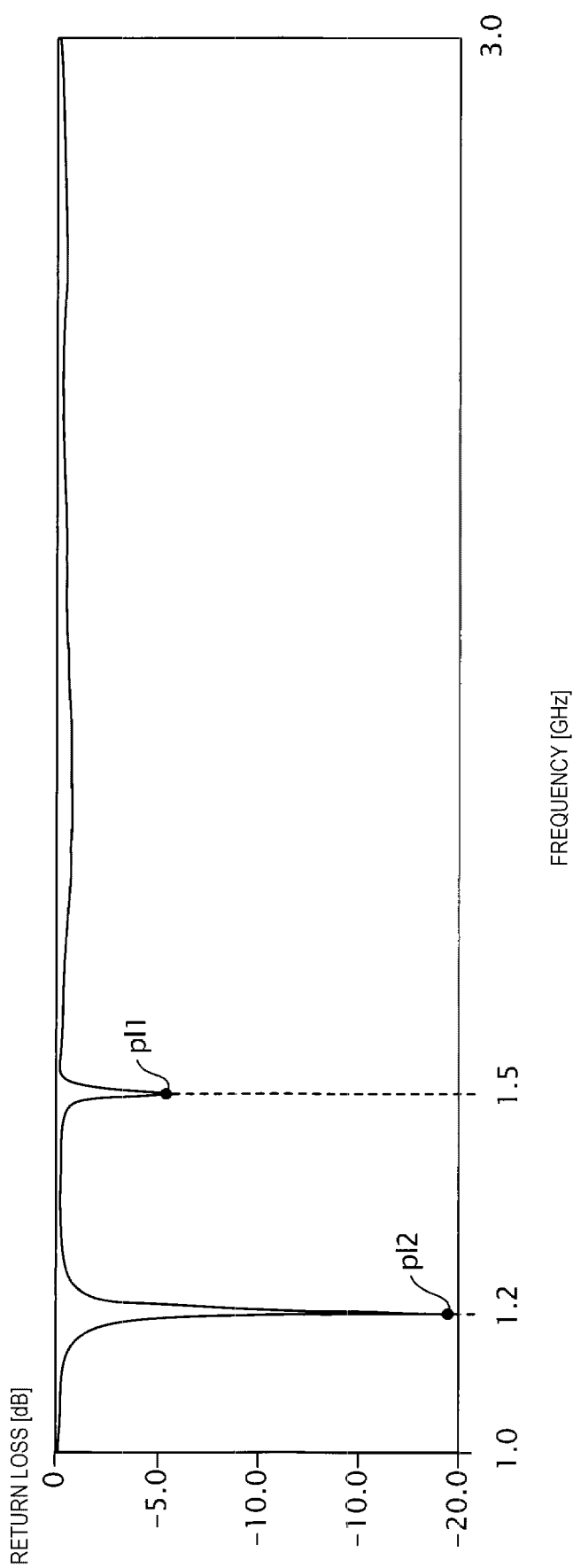
FIG. 21 is a diagram illustrating a relationship between a frequency and a return loss of the GPS antenna.

FIG. 21 is a diagram illustrating a relationship between a frequency and a return loss of the GPS antenna 60. In the graph illustrated in FIG. 21, a horizontal axis represents the frequency and a vertical axis represents the return loss. If reflection is small, that is, the frequency is a resonance frequency, the return loss increases toward a minus side. The resonance frequency of the GPS antenna 60 is designed to be 1.5 GHz, and in the graph illustrated in FIG. 21, a plot p11 illustrates that the resonance frequency of the GPS antenna 60 is 1.5 GHz. Further, a plot p12 illustrates that a resonance frequency of a parasitic antenna is 1.2 GHz. As described above, in the fourth embodiment, it is possible to handle reception of two frequencies (2 bands). It is possible to adjust the frequency of the parasitic antenna by changing installation positions of the ground line 605 and the signal line 606.

Figure 22:
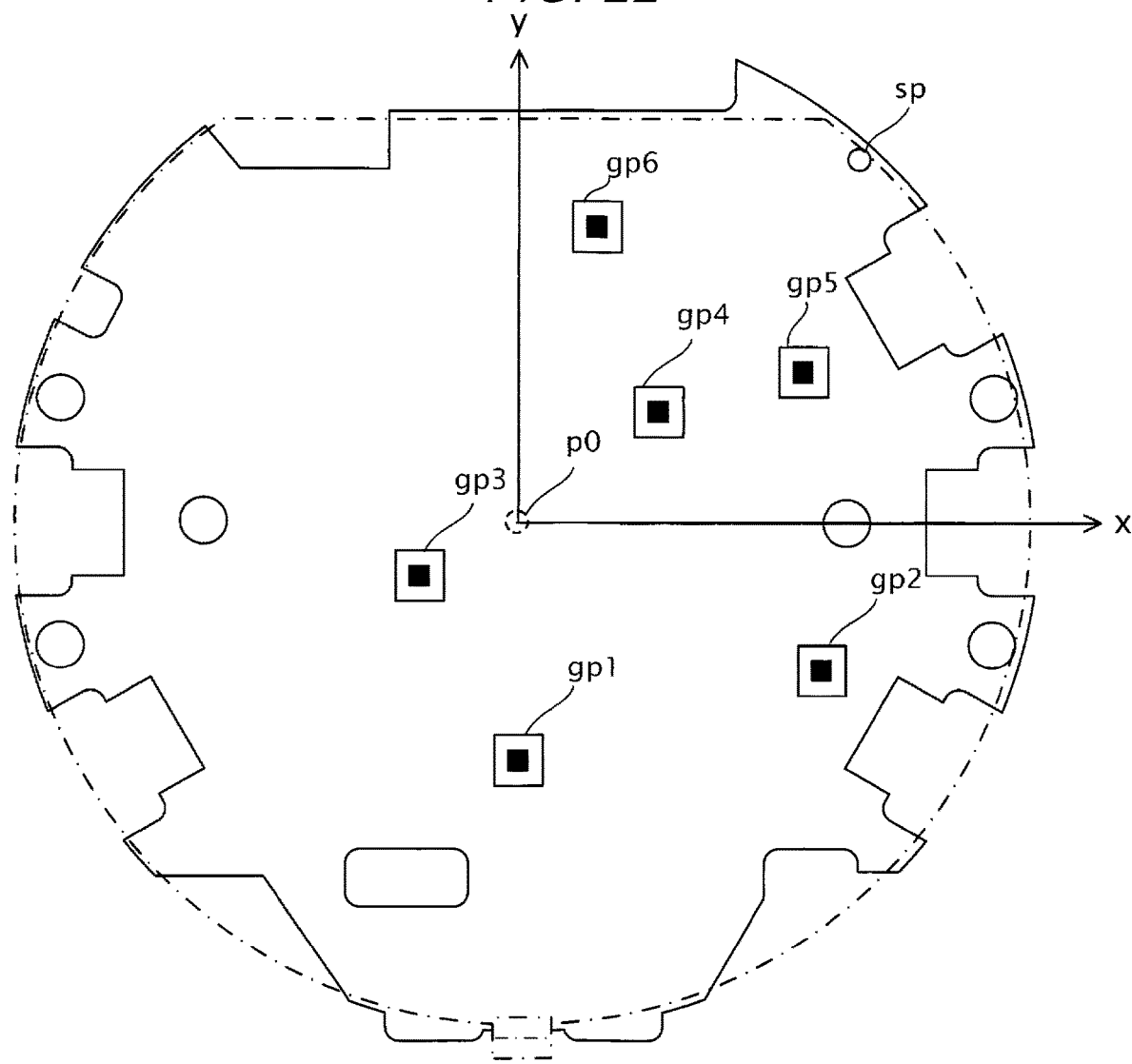
FIG. 22 is a diagram illustrating a relationship between an installation position of a ground line and a resonance frequency.

FIG. 22 is a diagram illustrating a relationship between an installation position of the ground line 605 and a resonance frequency. FIG. 22 illustrates a simulation result of the resonance frequency of the parasitic antenna according to the installation position of the ground line 605. In specific examples, the frequency of the parasitic antenna in a case where an installation position of the signal line 606 is a position sp1, and the installation position of the ground line 605 is a position gp1, a position gp2, a position gp3, a position gp4, a position gp5, or a position gp6 is simulated. Further, permittivity of the core material of the GPS antenna 60 is 2.3 and an interval between the GPS antenna 60 and the circuit substrate 5 is 1.5 mm. Hereinafter, with a center p0 of the display unit 4 as an origin, coordinates of each of the position gp1, the position gp2, the position gp3, the position gp4, the position gp5, and the position gp6, and the frequency of the parasitic antenna at each of the positions which is the simulation result are described.

Position gp1: coordinates (0, −10): resonance frequency of 1.9 GHz

Position gp2: coordinates (10, −6): resonance frequency of 1.747 GHz

Position gp3: coordinates (−5, −3): resonance frequency of 2.0 GHz

Position gp4: coordinates (5, 3): resonance frequency of 1.809 GHz

Position gp5: coordinates (10, 6): resonance frequency of 1.618 GHz

Position gp6: coordinates (3, 10): resonance frequency of 1.652 GHz

Based on the above simulation results, as the installation position of the ground line 605 is farther from the installation position of the signal line 606, the resonance frequency of the parasitic antenna tends to increase. As described above, it is possible to adjust the frequency of the parasitic antenna by changing the installation position of the ground line 605 and the installation position of the signal line 606. At this time, since the resonance frequency of the GPS antenna 60 is fixed regardless of the installation positions of the ground line 605 and the signal line 606, it is easy to adjust the resonance frequency of the GPS antenna 60 and the resonance frequency of the parasitic antenna.

Effect of Fourth Embodiment

As described above, in the fourth embodiment, it becomes possible to use a structure in which the circuit substrate 5 is a ground plate and two conductive plates formed of the second electrode 602 and the circuit substrate 5 are opposed to each other, as a parasitic antenna. Accordingly, in the electronic timepiece 100, it is possible to handle reception of 2 bands by the resonance frequency of the GPS antenna 60 and the resonance frequency of the parasitic antenna.

In sensitivity measurement by the actual instrument, it is possible to obtain the resonance frequency of 1.5 GHz of the GPS antenna 60 and the resonance frequency of 900 MHz of the parasitic antenna. More specifically, at 900 MHz, it is possible to obtain a peak gain of approximately −3 dB of a peak gain of the resonance frequency of the GPS antenna 60.

Fifth Embodiment

In the first embodiment to the fourth embodiment, the first electrode 601 and the second electrode 602 are short-circuited by the short circuit 603, but the fifth embodiment has a configuration in which the GPS antenna 60 does not include the short circuit 603. Hereinafter, the fifth embodiment will be described. In embodiments and modification examples below, the same components as the effect or the function of the first embodiment, the second embodiment, the third embodiment, or the fourth embodiment are denoted by the same reference numerals as the first embodiment, the second embodiment, the third embodiment, or the fourth embodiment and a detail description thereof will be appropriately omitted.

FIG. 23 is a simplified diagram of a wiring state according to the fifth embodiment. Since the description of the components to be described below will be omitted, unless otherwise described, it is assumed that the component is a component related to the fifth embodiment.

As illustrated in FIG. 23, in a wiring state between the GPS antenna 60 and the circuit substrate 5, the GPS antenna 60 and the circuit substrate 5 according to the fourth embodiment are not almost changed, and the circuit substrate 5 is connected to the first electrode 601 by the signal line 606. Further, the circuit substrate 5 is connected to the second electrode 602 by the ground line 605. On the other hand, the GPS antenna 60 does not include the short circuit 603.

Effect of Fifth Embodiment

Also in the fifth embodiment, it is possible to handle reception of 2 bands by the resonance frequency of the GPS antenna 60 and the resonance frequency of the parasitic antenna.

Modification Example

Each of the above embodiments can be variously modified. Specific modification examples will be described below. The two or more embodiments arbitrarily predetermined from the following examples can be appropriately merged within a range not mutually contradictory. In the modification example described below, the same components as those in each of the embodiments are denoted by the same reference numerals and a description thereof will be appropriately omitted.

The second embodiment includes one recess portion 6022, but the GPS antenna 60 may include a plurality of recess portions 6022 and may have a shape surrounding only a specific portion of the circuit substrate 5.

In the second embodiment, it is described that the top portion 6021T is in close contact with the circuit substrate 5, but the top portion 6021T may simply be in contact with the circuit substrate 5. However, in order to prevent the top portion 6021T from being separated from the circuit substrate 5 due to impact on the electronic timepiece 100, such as dropping the electronic timepiece 100 on a ground, the top portion 6021T is preferably in close contact with the circuit substrate 5.

In the fourth embodiment and the fifth embodiment, the resonance frequency of the GPS antenna 60 may coincide with the resonance frequency of the parasitic antenna or may be different from the resonance frequency of the parasitic antenna. In a case where the resonance frequency of the GPS antenna 60 coincides with the resonance frequency of the parasitic antenna from each other, it is possible to improve sensitivity of the GPS antenna 60 as compared with a case where there is no parasitic antenna.

In each of the above embodiments, the projection portion 6021 may have a taper shape tapering toward the circuit substrate 5. In this case, when seen in plan view, a tail portion other than the top portion 6021T of the projection portion 6021 may overlap with the circuit component.

In each of the above embodiments, it is described that the core material of the GPS antenna 60 is molded with a resin having a low dielectric tangent, but the embodiment is not limited thereto, for example, the core material may be a nonconductor.

In each of the above embodiments, the GPS antenna 60 receives the satellite signal transmitted from the GPS satellite, but a satellite signal from a positioning satellite of GNSS or a positioning satellite other than the GNSS may be used. For example, an information processing apparatus may receive satellite signals from satellites of one system or two or more systems among a wide area augmentation system (WAAS), a European geostationary-satellite navigation overlay service (EGNOS), a quasi zenith satellite system (QZSS), a global navigation satellite system (GLONASS), a GALILEO, a Beidou Navigation Satellite System (BeiDou), and the like.

In each of the above embodiments, the number of buttons included in the electronic timepiece 100 is not limited to 5 in the embodiment described above, may be smaller than 5, or may be larger than 5. In addition, a disposition of the buttons included in the electronic timepiece 100 is not limited the disposition in the embodiment described above.

In the above, each of the embodiments is applied to the GPS antenna 60 which receives the satellite signal, but each of the embodiments may be applied to an antenna which transmits and receives another wireless signal. The other wireless signal may be, for example, Bluetooth (registered trademark) or Wi-fi (registered trademark). In addition, in the third embodiment, since the GPS radio wave which is a right-handed circular-polarized wave is received, it is described that the GPS antenna 60 includes the unevenness portion so as to have right-handed predominance, but in a case of receiving a radio wave which is a left-handed circular-polarized wave, an antenna to which each of the embodiments is applied preferably includes an unevenness portion so as to have left-handed predominance.

In the above, each of the embodiments is applied to the electronic timepiece, but the electronic apparatus to which each of the embodiments is applied is not limited to the electronic timepiece and each of the embodiments may be applied to an electronic apparatus including an antenna and a circuit substrate. The electronic apparatus including the antenna and the circuit substrate is, for example, a USB transceiver which wirelessly connects to a device such as a mouse or a keyboard and connects to a personal computer (PC) or the like by a universal serial bus (USB), a beacon terminal which transmits an own identifier (ID) and a measurement result measured by a sensor according to a low power wide area (LPWA) standard, or the like.

In addition, each of the above embodiments may be applied to an electronic apparatus including a display unit, an antenna, and a circuit substrate. The electronic apparatus including the display unit, the antenna, and the circuit substrate is, for example, a mobile phone, a smartphone, a tablet terminal, a game machine, or the like. As described above, a projection portion of the antenna to which each of the embodiments is a surface opposite to the circuit substrate. Accordingly, in the electronic apparatus to which each of the embodiments is applied, by flattening the surface opposite to the display unit of the antenna, it is possible to improve sensitivity of the antenna and to easily dispose the display unit while maintaining a thickness of the electronic apparatus.

What is claimed is:

1. An electronic apparatus comprising:
   a circuit substrate on which circuit components are disposed; and
   an antenna that includes
   a first electrode, and
   a second electrode which is disposed between the first electrode and the circuit substrate, is opposite to a surface, on which the circuit components are disposed, of the circuit substrate, and includes a projection portion protruding in a direction from the first electrode toward the circuit substrate, the projection portion not overlapping with the circuit components in plan view along a thickness direction of the circuit substrate.

2. The electronic apparatus according to claim 1,
   the projection portion surrounds the circuit components in the plan view, and
   the projection portion is in contact with the circuit substrate.

3. The electronic apparatus according to claim 2,
   wherein the circuit substrate is connected with the first electrode by a signal line, and
   the circuit substrate is connected with the second electrode by a ground line.

4. The electronic apparatus according to claim 1,
   wherein the second electrode covers the circuit components.

5. The electronic apparatus according to claim 1,
   wherein the second electrode functions as an electromagnetic shield.

6. The electronic apparatus according to claim 1,
   wherein the antenna includes a short circuit which shunts the first electrode and the second electrode, and
   in a case where the antenna is divided into a first area and a second area by a second virtual straight line passing through a center of a first virtual straight line connecting one end and the other end of the short circuit in the plan view and equally dividing an area of the first electrode in half, a volume of the first area is different from a volume of the second area.

7. The electronic apparatus according to claim 1,
   wherein the circuit substrate is connected with the first electrode by a signal line, and
   the circuit substrate is connected with the second electrode by a ground line.

8. The electronic apparatus according to claim 1, further comprising:
   a display unit,
   wherein the antenna is positioned between the display unit and the circuit substrate.

9. The electronic apparatus according to claim 8,
   wherein the electronic apparatus is an electronic timepiece, and
   further comprises
   a housing which includes an opening, a bottom surface, and a side surface and accommodates the circuit substrate, the antenna, and the display unit, and
   a light-transmissive member which covers the opening.

10. An electronic apparatus comprising:
a circuit substrate on which circuit components are disposed; and
an antenna that includes
 a first electrode, and
 a second electrode which is disposed between the first electrode and the circuit substrate, is opposite to a surface, on which the circuit components are disposed, of the circuit substrate, and includes a recess portion recessing in a direction from the circuit substrate toward the first electrode, the recess portion overlapping with the circuit component in plan view along a thickness direction of the circuit substrate.

11. The electronic apparatus according to claim 10, wherein a volume of the recess portion is larger than a volume of the circuit components.

12. The electronic apparatus according to claim 10, wherein the recess portion surrounds the circuit components.

13. The electronic apparatus according to claim 10, wherein the antenna includes a short circuit which shunts the first electrode and the second electrode, and
in a case where the antenna is divided into a first area and a second area by a second virtual straight line passing through a center of a first virtual straight line connecting one end and the other end of the short circuit when seen in the plan view and equally dividing an area of the first electrode in half, a volume of the first area is different from a volume of the second area.

14. The electronic apparatus according to claim 10, wherein the circuit substrate and the first electrode are connected by a signal line, and
the circuit substrate and the second electrode are connected by a ground line.

* * * * *